United States Patent [19]

Matsumoto et al.

[11] Patent Number: 4,760,003
[45] Date of Patent: Jul. 26, 1988

[54] ELECTROPHOTOGRAPHIC PHOTOSENSITIVE MEMBER CONTAINING DISAZO COMPOUND

[75] Inventors: Masakazu Matsumoto, Yokohama; Takao Takiguchi, Tokyo; Masataka Yamashita, Kawasaki; Shoji Umehara, Fuchu; Shozo Ishikawa; Hajime Miyazaki, both of Yokohama, all of Japan

[73] Assignee: Canon Kabushiki Kaisha, Tokyo, Japan

[21] Appl. No.: 865,452

[22] Filed: May 21, 1986

[30] Foreign Application Priority Data

May 24, 1985 [JP] Japan ................... 60-110100
May 28, 1985 [JP] Japan ................... 60-113043

[51] Int. Cl.$^4$ ............................. G03G 5/06
[52] U.S. Cl. ........................ 430/58; 430/59; 430/72; 430/73; 430/77; 430/78; 534/738; 534/759; 534/829; 534/830
[58] Field of Search ............ 430/58, 73, 74, 76, 430/78

[56] References Cited

U.S. PATENT DOCUMENTS

| | | | |
|---|---|---|---|
| 4,346,157 | 8/1982 | Kakuta et al. | 430/58 |
| 4,418,133 | 11/1983 | Katagiri et al. | 430/58 |
| 4,447,513 | 5/1984 | Miyakawa et al. | 430/58 |
| 4,571,369 | 2/1986 | Yamashita | 430/76 |
| 4,582,771 | 4/1986 | Ohta | 430/58 |

*Primary Examiner*—J. David Welsh
*Attorney, Agent, or Firm*—Fitzpatrick, Cella, Harper & Scinto

[57] ABSTRACT

An electrophotographic photosensitive member comprises a photosensitive layer on a substrate, said photosensitive layer comprising a disazo pigment represented by the formula (1).

8 Claims, No Drawings

ELECTROPHOTOGRAPHIC PHOTOSENSITIVE MEMBER CONTAINING DISAZO COMPOUND

BACKGROUND OF THE INVENTION

1. Field of the Invention

This invention relates to an electrophotographic photosensitive member utilizing a novel electrophotographic photosensitive material, more particularly to an electrophotographic photosensitive member incorporating a disazo pigment having a specific molecular structure in the photosensitive layer.

2. Related Background Art

Pigments and dyes exhibiting photoconductivity have been heretofore reported in a large number of literatures. For example, there is a report about photoconductivity of phthalocyanine pigments in "RCA Review" Vol. 23, p. 413–419, September, 1962, and electrophotographic photosensitive members employing the phthalocyanine pigments are disclosed in U.S. Pat. Nos. 3,397,086 and 3,816,118. Otherwise, as organic semiconductors to be used for electrophotographic photosensitive members, there may be included, for example, pyrilium dyes disclosed in U.S. Pat. Nos. 4,315,983 and 4,327,169, and "Research Disclosure" 20517, May, 1981; squaric acid methine dyes disclosed in U.S. Pat. No. 3,824,099; and disazo pigments disclosed in U.S. Pat. Nos. 3,898,084 and 4,251,613.

Such organic semiconductors can be synthetized more readily as compared to inorganic semiconductors, and also they can be synthesized as the compounds having photoconductivity to the light of the required wavelength region. An electrophotographic photosensitive member having a coating of such an organic semiconductor formed on an electroconductive support has the advantage of improved color sensitivity, but only a few are satisfactory for practical purposes with respect to sensitivity and durability.

SUMMARY OF THE INVENTION

An object of the present invention is to provide a novel photoconductive material.

Another object of the present invention is to provide an electrophotographic photosensitive member which can be used in all of the existing electrophotographic processes and is provided with excellent practical sensitivity and durability having stable potential characteristics during repeated uses.

In accordance with the present invention, there is provided an electrophotographic photosensitive member having a photosensitive layer on an electroconductive substrate, said photosensitive layer comprising a disazo pigment represented by the formula (1):

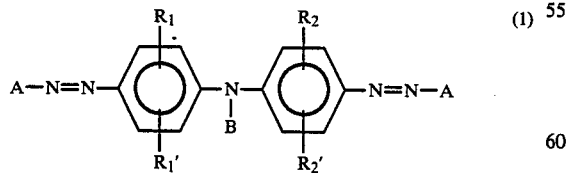

(1)

wherein $R_1$, $R_1'$, $R_2$, $R_2'$, and A are defined below.

DESCRIPTION OF THE PREFERRED EMBODIMENTS

In the above formula (1), $R_1$, $R_1'$, $R_2$ and $R_2'$ represent hydrogen, halogen, nitro, cyano or; alkyl, aralkyl, alkoxy or aryl group, the latter four groups of which may have a substituent, A represents a coupler residue having a phenolic OH group, and B represents hydrogen or nitroso group.

As the groups defined by $R_1$, $R_1'$, $R_2$ and $R_2'$, the alkyl group may include, for example, methyl, ethyl, propyl, and the like; the aralkyl group, for example, benzyl, phenethyl, naphthylmethyl and the like; the aryl group phenyl, diphenyl, naphthyl and the like; the alkoxy group, for example, methoxy, ethoxy and the like; the halogen fluorine, chlorine, bromine and iodine; and further cyano group and nitro group are included.

Examples of the substituents with which $R_1$, $R_1'$, $R_2$ and $R_2'$ may be substituted may include alkyl groups such as methyl, ethyl, propyl and the like; aralkyl groups such as benzyl, phenethyl, naphthylmethyl and the like; aromatic groups such as phenyl, naphthyl, anthranyl and the like; alkoxy groups such as methoxy, ethoxy and the like; halogen atoms such as fluorine, chlorine, bromine, iodine; and further cyano group and nitro group.

Further, the coupler residue having a phenolic OH group of A in the formula (1) may include those of the following formulae (2) to (8):

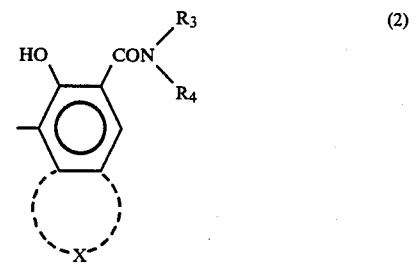

(2)

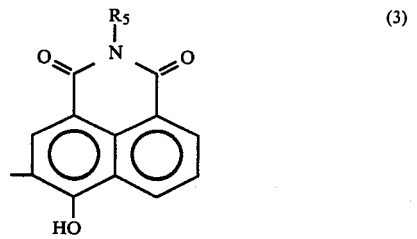

(3)

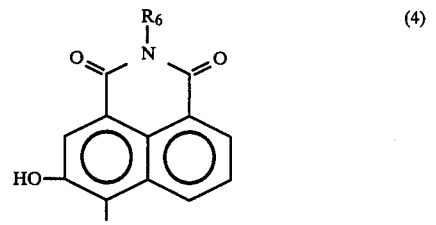

(4)

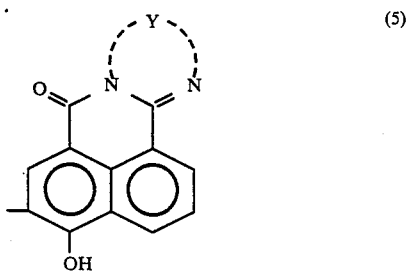

(5)

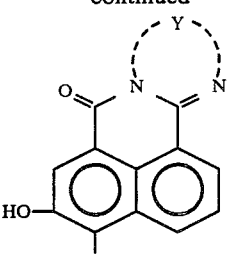

(6)

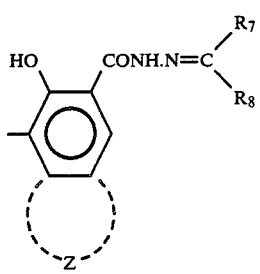

(7)

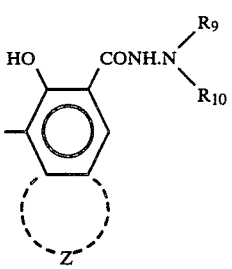

(8)

wherein X represents a residue to be fused with a benzene ring to form a polycyclic aromatic ring of anthracene ring, or a heterocyclic ring, all of which may have a substituent; $R_3$ and $R_4$ represent hydrogen, alkyl, aryalkyl, aryl or heterocyclic ring, the latter four groups of which have a substituent, or taken together represent a residue to form a cyclic amino group together with the nitrogen atom; $R_5$ and $R_6$ each represent alkyl, aralkyl, aryl, all of which may have a substituent; Y represents a divalent aromatic hydrocarbon group or forms a divalent heterocyclic group together with the nitrogen atoms; Z represents a residue to be fused with a benzene ring to form a polycyclic aromatic ring or heterocyclic ring; $R_7$ and $R_8$ represent hydrogen, aryl or heterocyclic group, the latter two of which may have a substituent or a residue which forms a 5- to 6-membered ring together with the center carbon atom, which 5- to 6-membered ring may have a fused aromatic ring; $R_9$ and $R_{10}$ represent hydrogen, alkyl, aralkyl, aryl or heterocyclic group, the latter four of which may have a substituent.

The above polycyclic aromatic ring to be formed by fusion of X with the benzene ring is anthracene, and examples of the above heterocyclic ring to be formed by such fusion of X may include carbazole, benzcarbazole, dibenzofuran, benzonaphthofuran, diphenylenesulfide and others. These may be substituted with substituents as mentioned above. The fused ring to be formed by fusion of X with benzene ring may desirably be anthracene, benzcarbazole or carbazole. In the case of $R_3$ and the $R_4$, the alkyl may be exemplified by methyl, ethyl, propyl, butyl and the like; the aralkyl by benzyl, phenethyl, naphthylmethyl and the like; the aryl by phenyl, diphenyl, naphthyl, anthryl and the like. Particularly, it is preferable to use a compound having a structure in which $R_3$ is hydrogen and $R_4$ is a phenyl group having an electron attracting group such as halogen, nitro, cyano, trifluoromethyl and the like, or an alkyl group such as methyl, ethyl, butyl and the like at the o-position. Examples of the heterocyclic ring include carbazole, dibenzofuran, benzimidazolone, benzthiazole, thiazole, pyridine and the like.

Typical examples of $R_5$ and $R_6$ may include the same as mentioned above for $R_3$ and $R_4$. These can also be substituted with the substituents as mentioned above. Further, $R_3$ to $R_6$ may be substituted with other substituents, including alkoxy groups such as methoxy, ethoxy, propoxy, etc.; halogens such as fluorine, chlorine, bromine, iodine, etc.; nitro; cyano; substituted amino group such as dimethylamino, diethylamino, dibenzylamino, diphenylamino, etc.

In the definition of Y, the divalent aromatic hydrocarbon group may be, for example, a monocyclic aromatic hydrocarbon group such as o-phenylene, or a fused polycyclic aromatic hydrocarbon group such as o-naphthylene, perinaphthylene, 1,2-anthrylene, 9,10-phenanthrylene and the like. Examples of the divalent heterocyclic ring formed together with nitrogen atom may include 5- to 6-membered divalent groups such as 3,4-pyrozolediyl, 2,3-pyridinediyl, 4,5-pyrimidinediyl, 6,7-indazolediyl, 5,6-benziimidazolediyl, 6,7-quinolinediyl group, etc.

The aryl group or the heterocyclic group of $R_7$ and $R_8$ may be examplified by phenyl, naphthyl, anthryl, pyrenyl, etc.; pyridiyl, thienyl, furyl, carbazolyl, etc. These may also be substituted with the substituents as mentioned above.

As the substituents on the aryl group and the heterocyclic group represented by $R_7$ and $R_8$, there may be included halogens such as fluorine, chlorine, bromine, iodine, etc.; alkyl groups such as methyl, ethyl, propyl, butyl, etc.; alkoxy groups such as methoxy, ethoxy, propoxy, butoxy, etc.; nitro; cyano; substituted amino groups such as dimethylamino, diethylamino, dipropylamino, dibenzylamino, diphenylamino, morpholino, piperidino, pyrrolidino, etc. Also, $R_7$ and $R_8$ may represent a residue forming a 5- to 6-membered ring together with the center carbon atom, and the 5- to 6-membered ring may also have a fused aromatic ring. The examples may include groups such as cyclopentylidene, cyclohexylidene, 9-fluorenylidene, 9-xanthenylidene, etc.

$R_9$ and $R_{10}$ in the formula (8) represent hydrogen or an optionally substituted: alkyl group (e.g. methyl, ethyl, propyl, butyl), aralkyl group (e.g. benzyl, phenethyl, naphthylmethyl), aryl group (e.g. phenyl, naphthyl, anthryl, diphenyl) or heterocyclic group (e.g. carbazole, dibenzofuran, benzimidazolone, benzthiazole, thiazole, pyridene). Examples of the substituents on the alkyl, aralkyl, aryl or heterocyclic groups represented by $R_9$ and $R_{10}$ may include halogens such as fluorine, chlorine, bromine, iodine, etc.; alkyl groups such as methyl, ethyl, propyl, butyl, etc.; alkoxy groups such as methoxy, ethoxy, propoxy, butoxy, etc.; nitro; cyano; substituted amino groups such as dimethylamino, dipropylamino, dibenzylamino, diphenylamino, morpholino, piperidino, pyrrolidino and the like.

Z in the formulas (7) and (8) represents a residue which is fused with benzene ring to form a polycyclic aromatic ring or a heterocyclic ring. Examples of the polycyclic aromatic ring formed by the fusion of Z may include naphthalene, and examples of the heterocyclic ring formed by the fusion of Z may include anthracene, carbazole, benzcarbazole, benzofuran, benzonaphthofuran, diphenylsulfide, etc. The ring to which X is bonded may more desirably be an anthracene ring, benzcarbazole ring or carbazole ring. Particularly, benzcarbazole ring has a remarkable effect of elongating the spectral sensitive region to longer wavelength region and is therefore preferably used for preparation of a photosensitive member having high sensitivity to the semiconductor laser region.

The disazo pigments of the present invention can be further improved in the sensitivity by attachment of hydrogen or nitroso group to the nitrogen atom of the diarylamine skeleton and combination with the specific coupler residue. Thus, high sensitivity can be achieved, and therefore application for high speed copying machine, laser beam printer, LED printer and liquid crystal printer is rendered possible. Further, it is also possible to obtain a beautiful image stably, because stable potential can be ensured without dependence on the history of the photosensitive member.

Examples of disazo pigment of the general formula (1) wherein B is hydrogen:

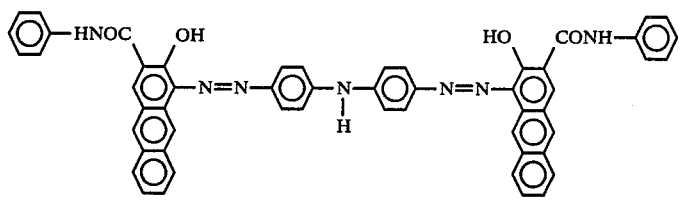

1-(1)

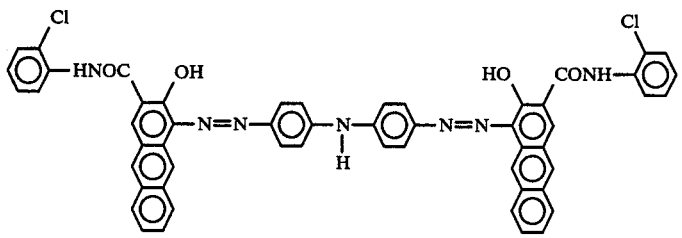

1-(2)

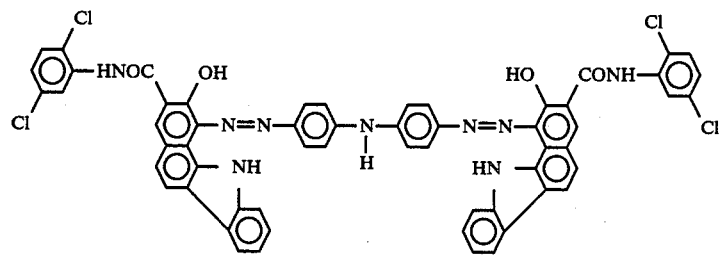

1-(3)

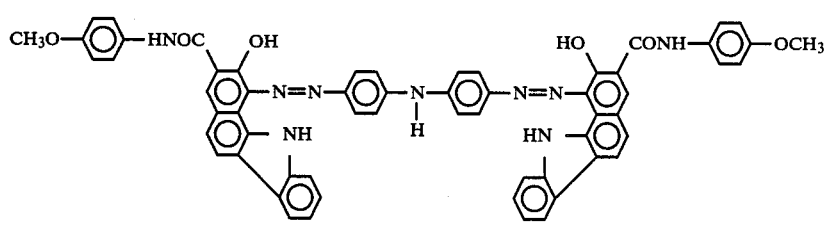

1-(4)

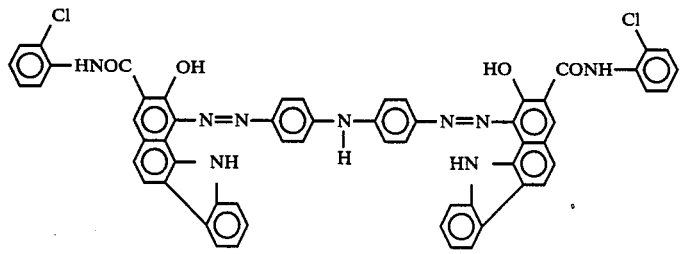

1-(5)

-continued
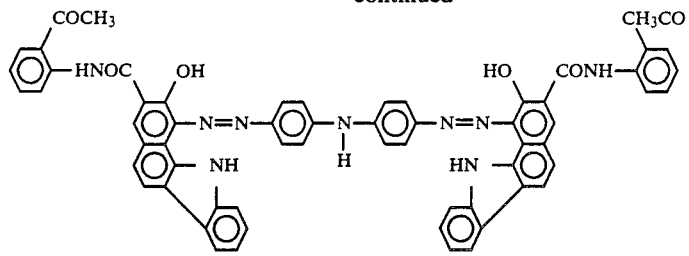
1-(6)
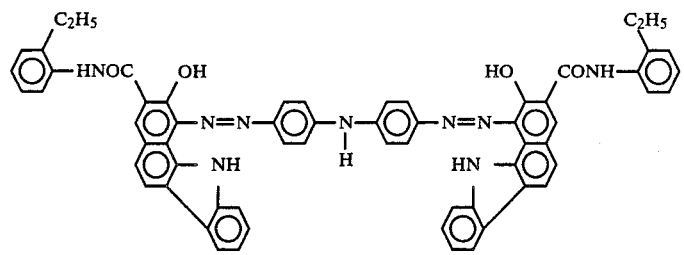
1-(7)
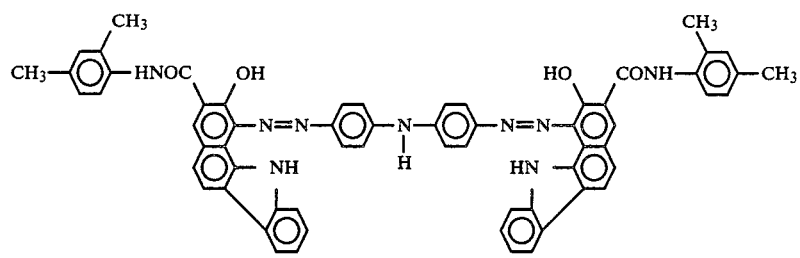
1-(8)
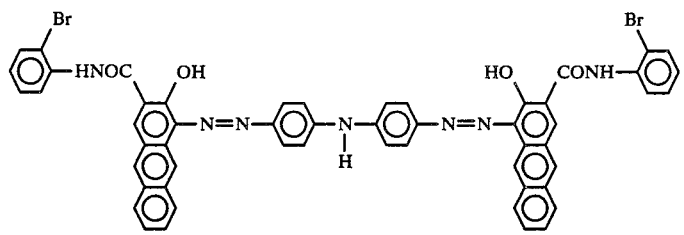
1-(9)
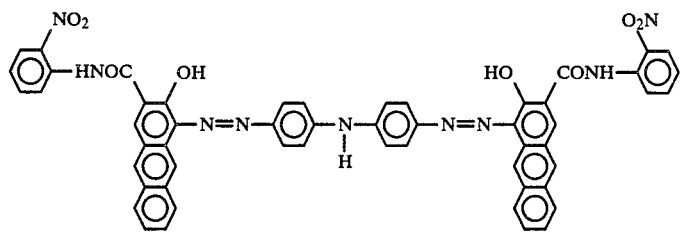
1-(10)
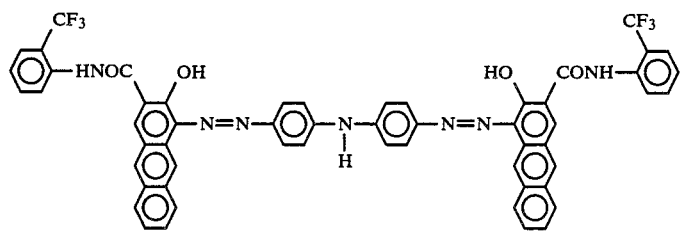
1-(11)
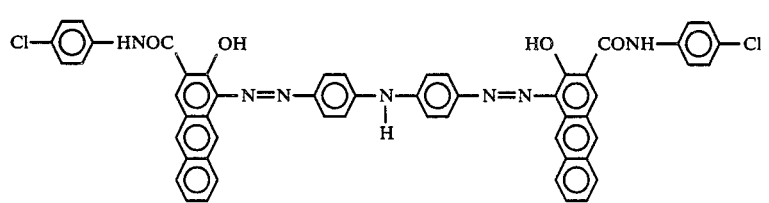
1-(12)

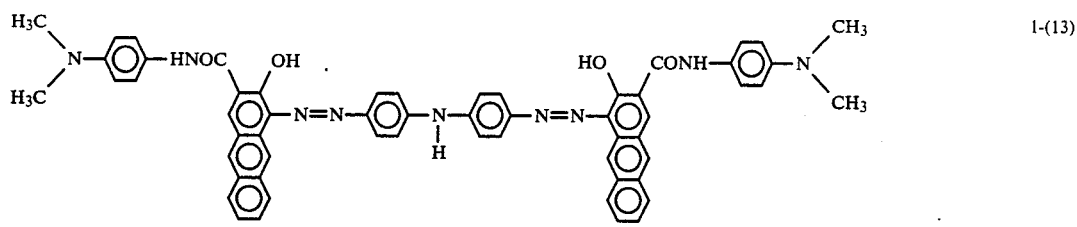
1-(13)
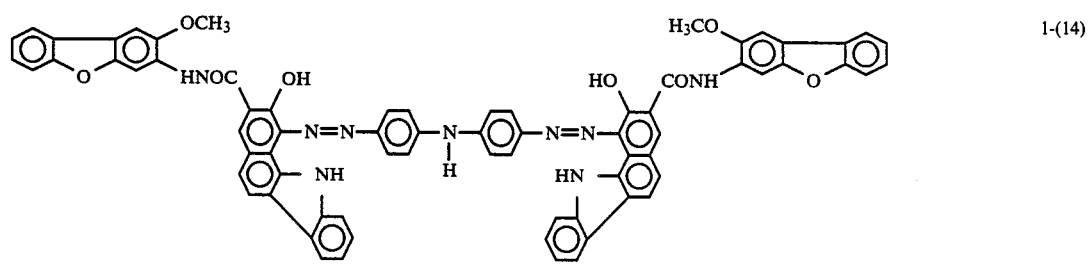
1-(14)
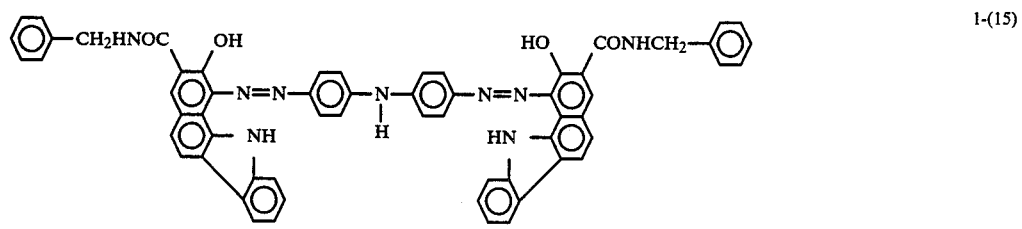
1-(15)
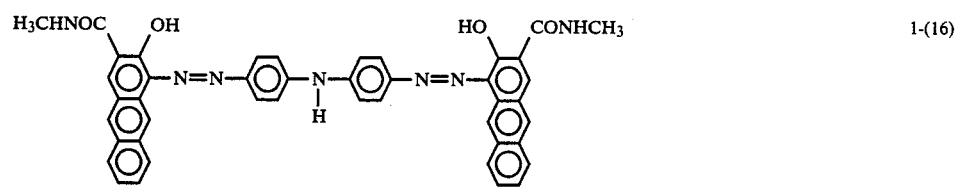
1-(16)
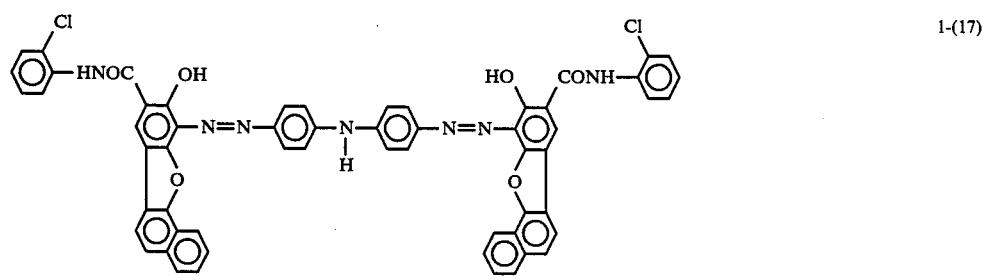
1-(17)
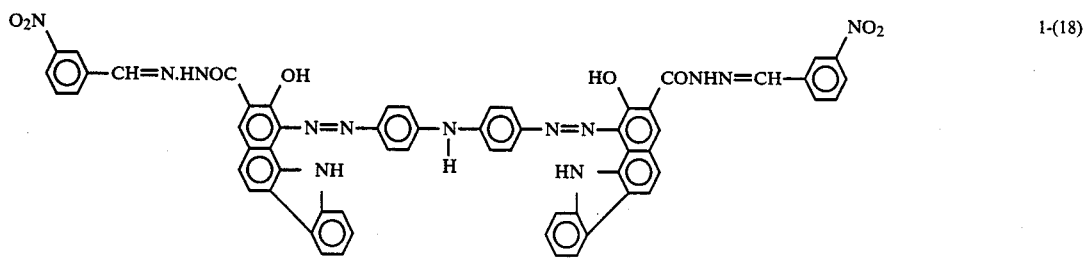
1-(18)

-continued
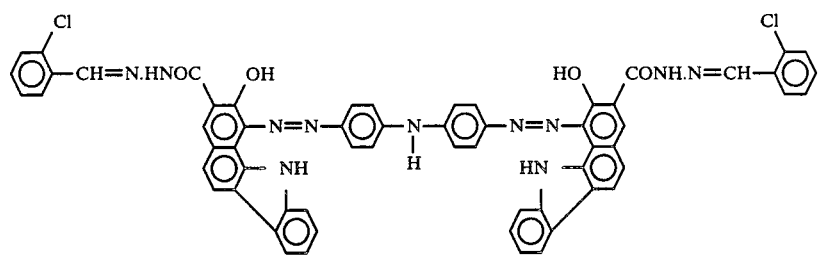
1-(19)
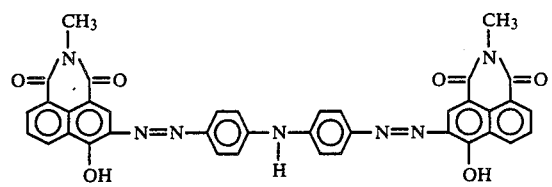
1-(20)
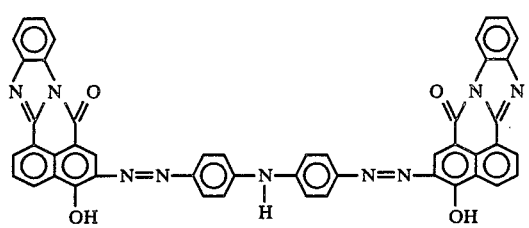
1-(21)
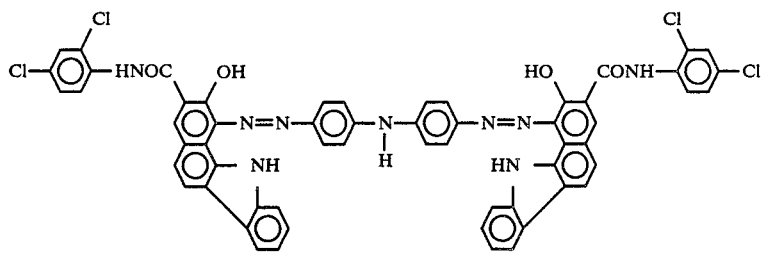
1-(22)
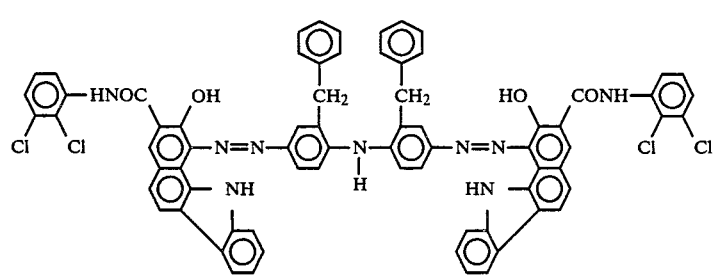
1-(23)
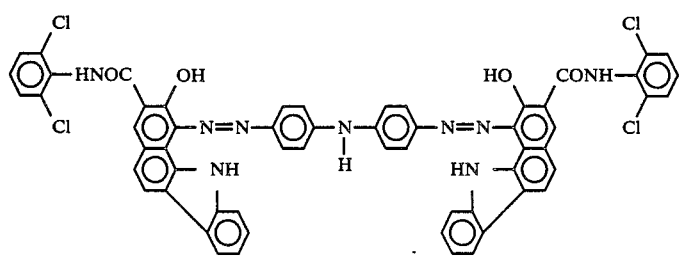
1-(24)

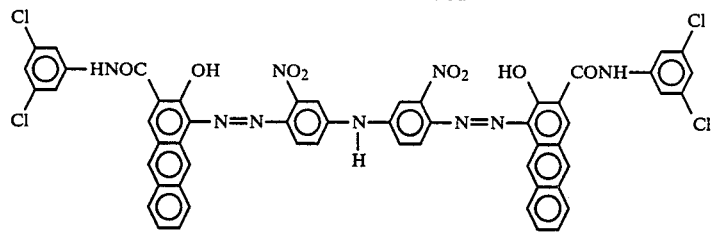
1-(25)
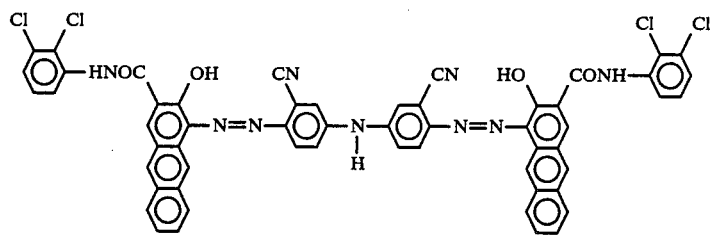
1-(26)
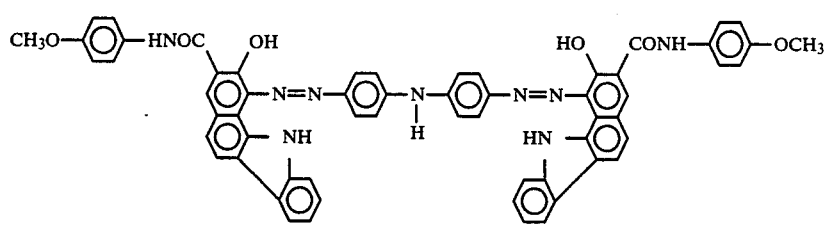
1-(27)
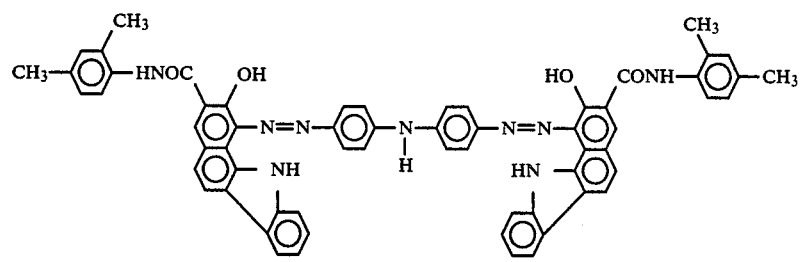
1-(28)
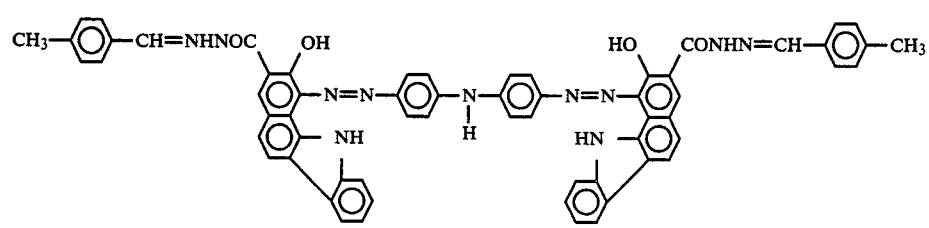
1-(29)
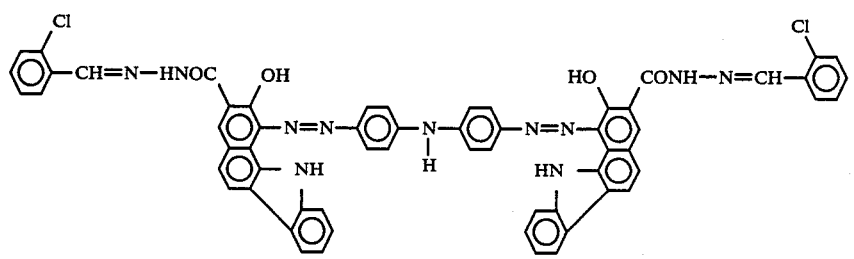
1-(30)
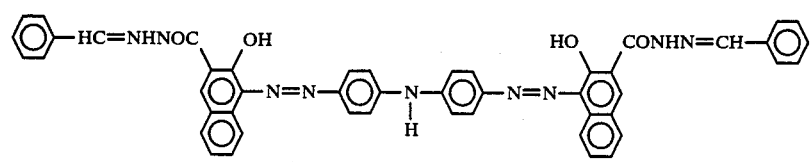
1-(31)

-continued
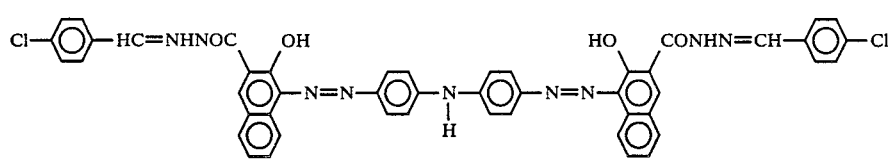
1-(32)
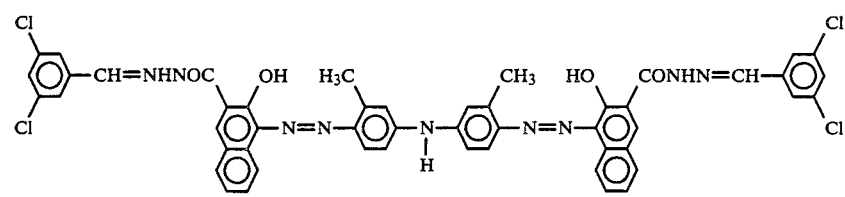
1-(33)
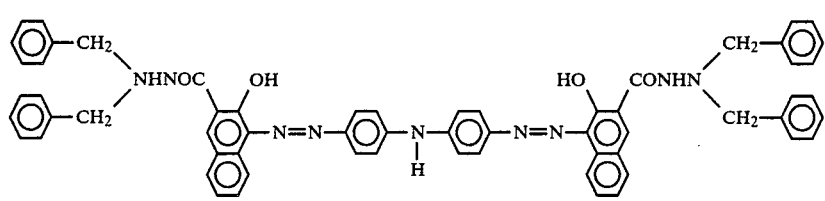
1-(34)
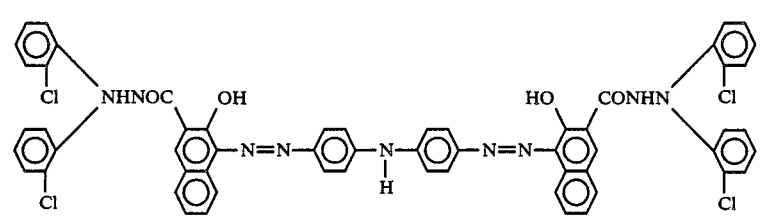
1-(35)
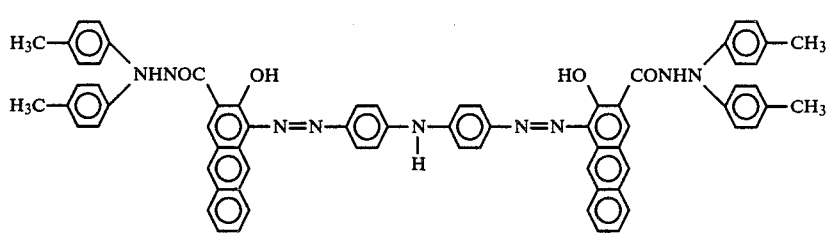
1-(36)
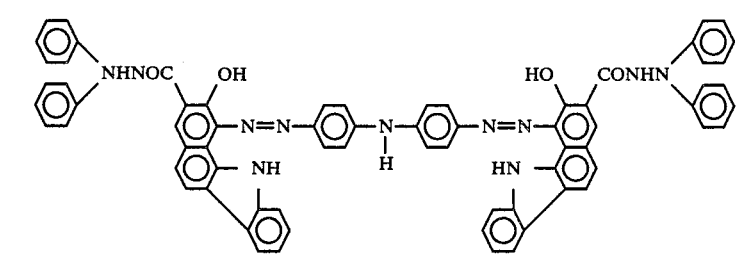
1-(37)
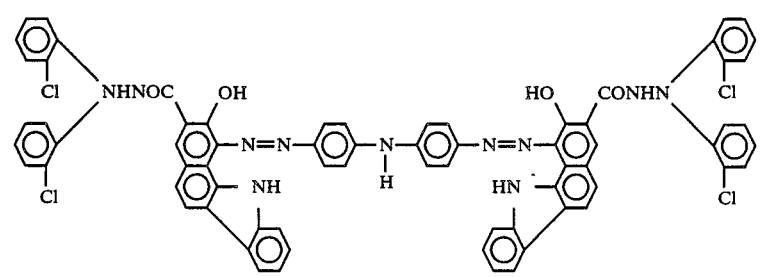
1-(38)

-continued
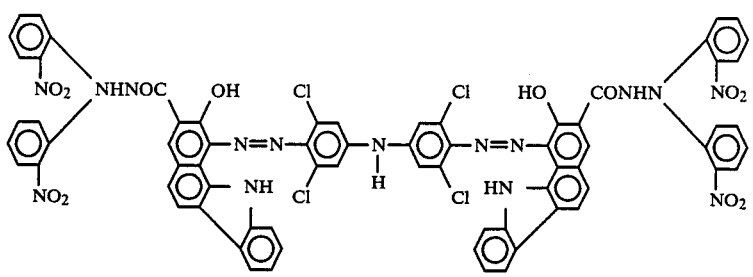
1-(39)
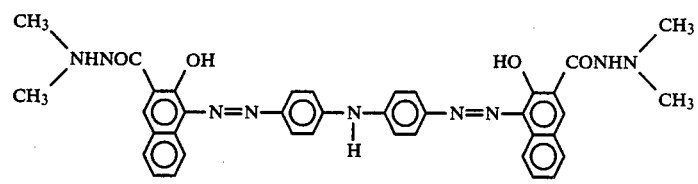
1-(40)
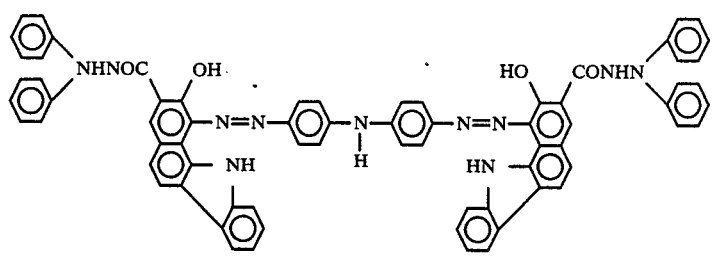
1-(41)
Examples of disazo pigment of the general formula (1) wherein B is nitroso group:
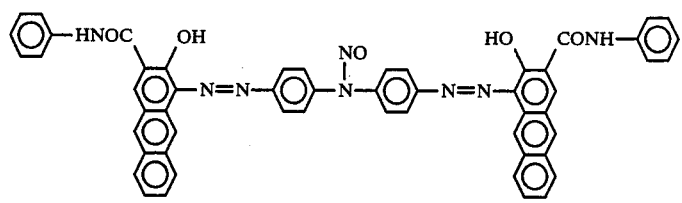
2-(1)
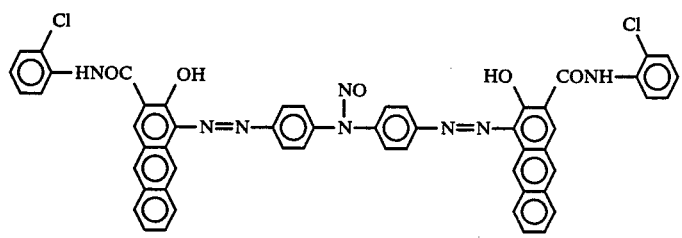
2-(2)
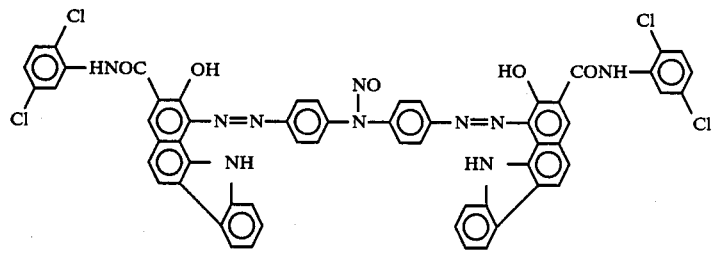
2-(3)

-continued
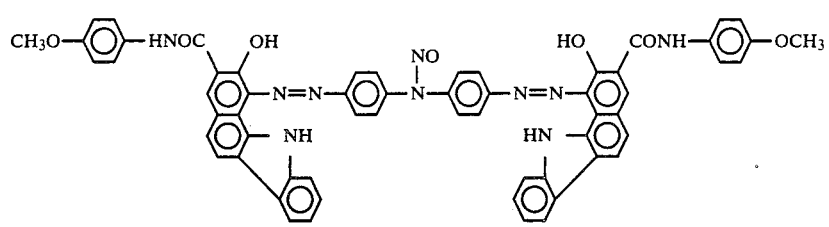
2-(4)
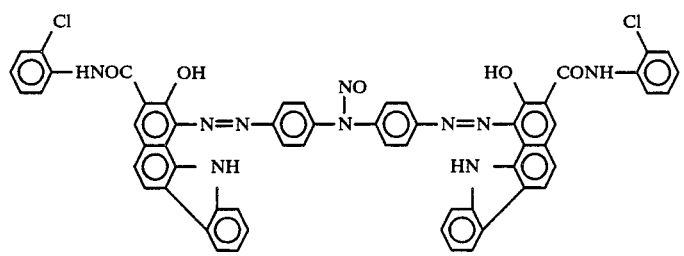
2-(5)
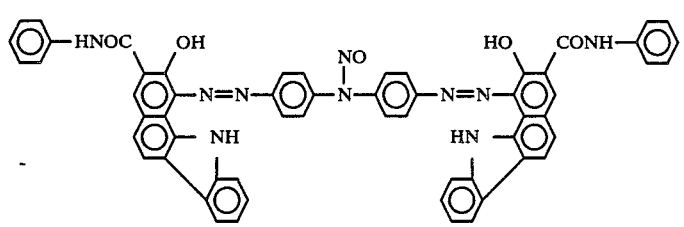
2-(6)
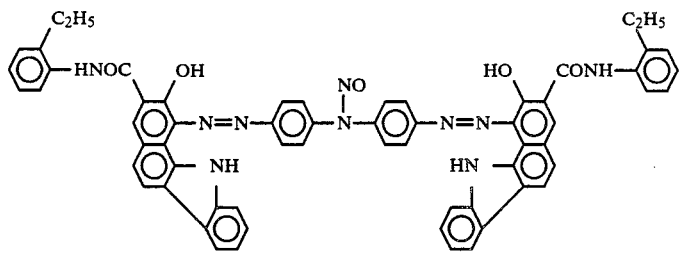
2-(7)
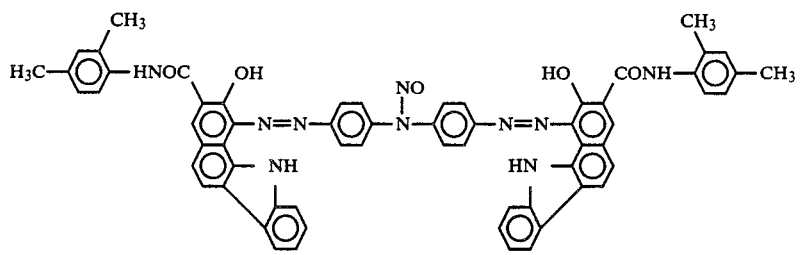
2-(8)
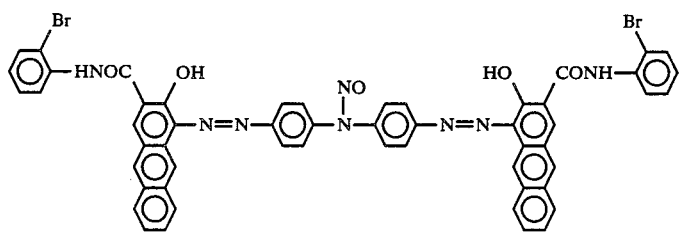
2-(9)

-continued
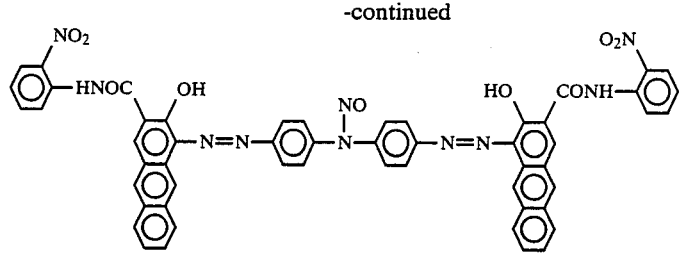
2-(10)
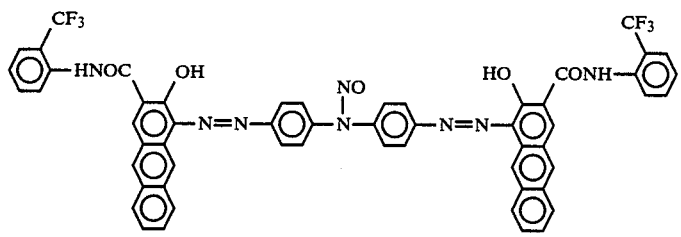
2-(11)
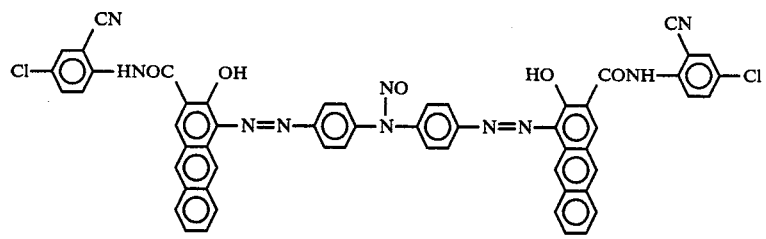
2-(12)
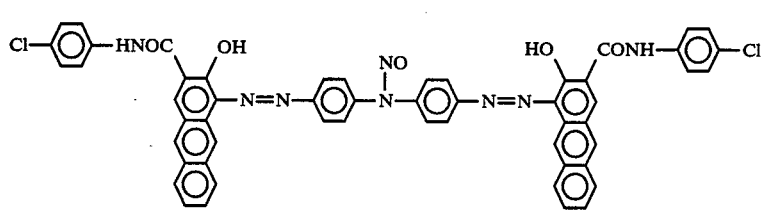
2-(13)
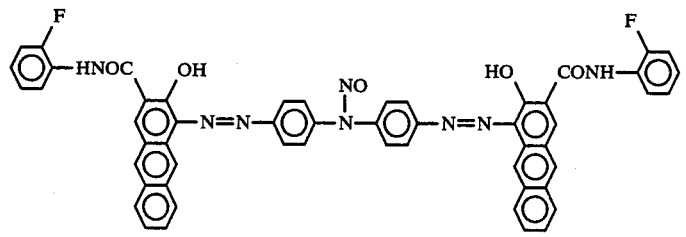
2-(14)
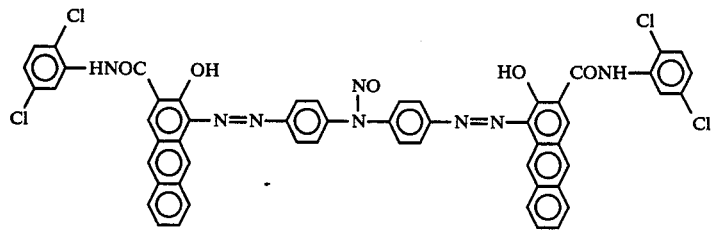
2-(15)
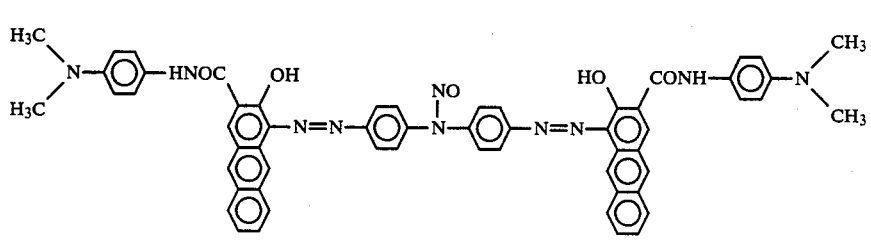
2-(16)

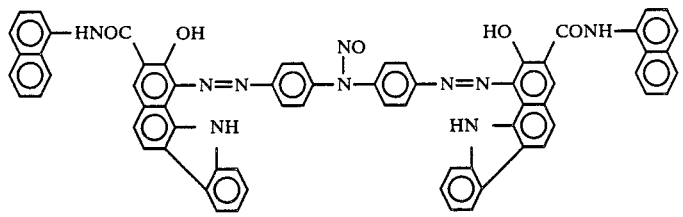
2-(17)
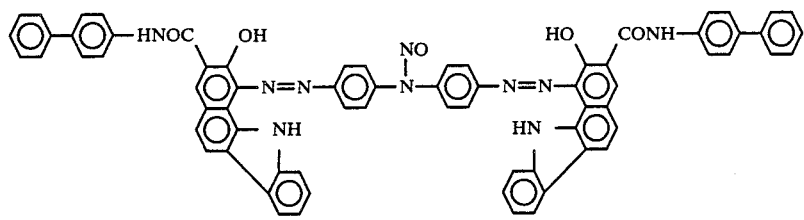
2-(18)
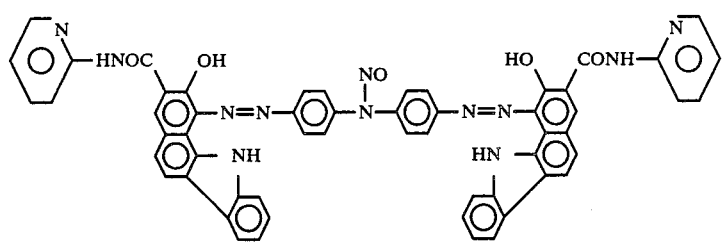
2-(19)
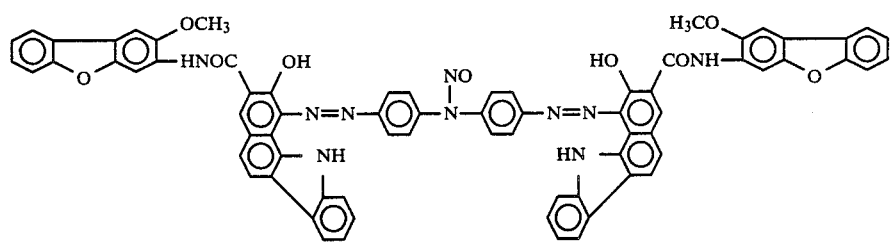
2-(20)
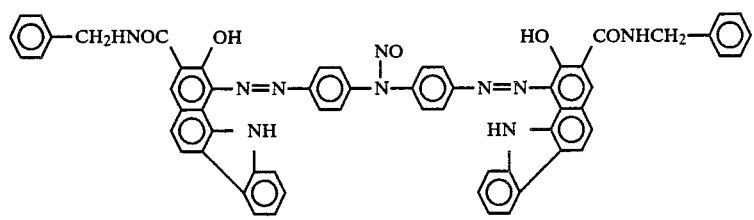
2-(21)
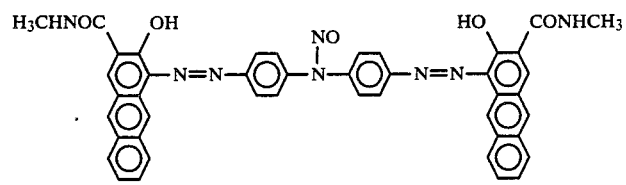
2-(22)
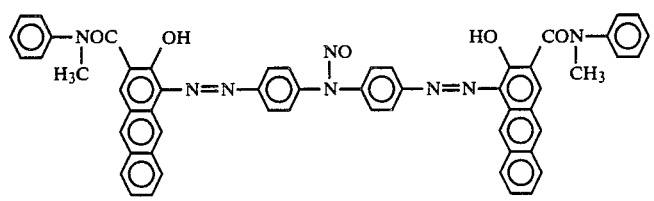
2-(23)

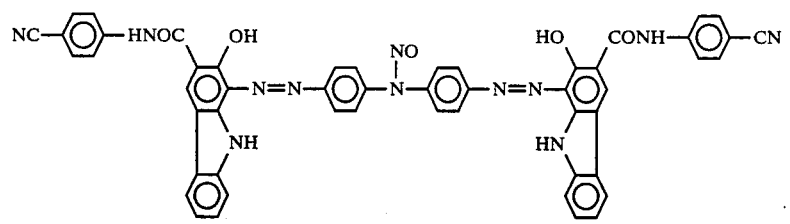
2-(24)
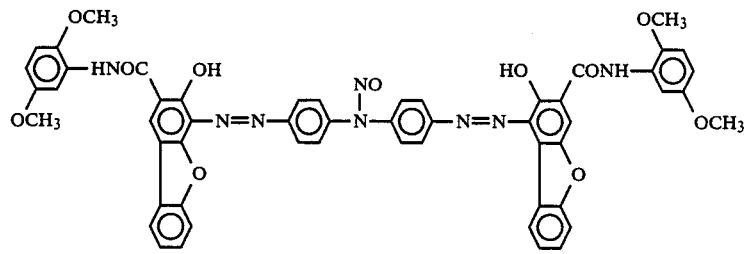
2-(25)
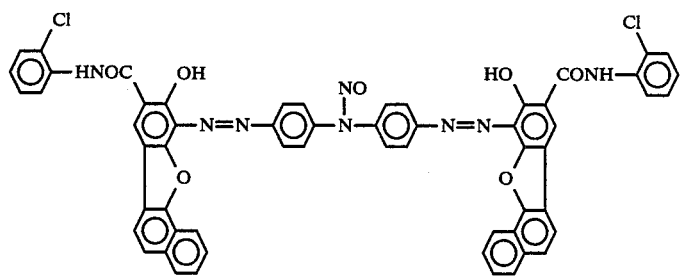
2-(26)
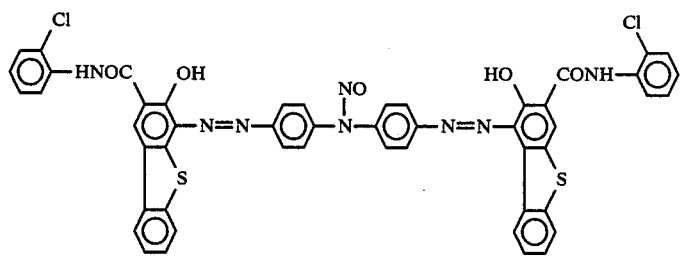
2-(27)
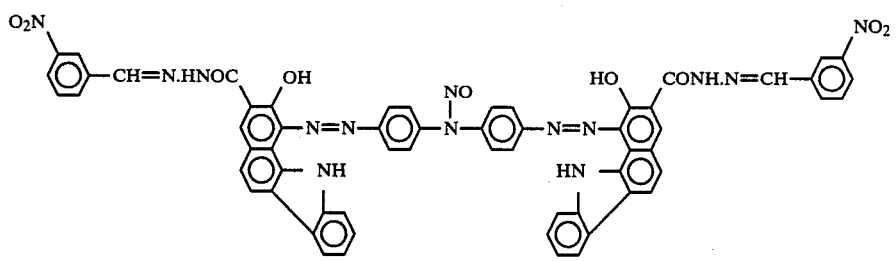
2-(28)
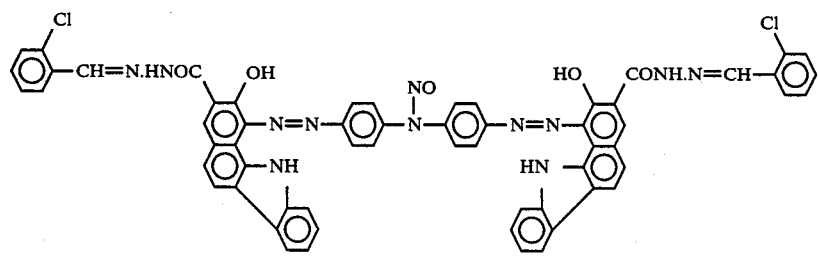
2-(29)

2-(30)
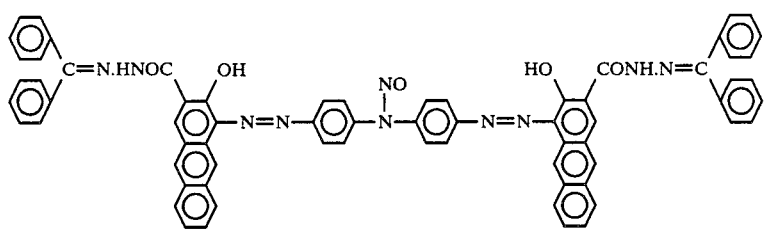
2-(31)
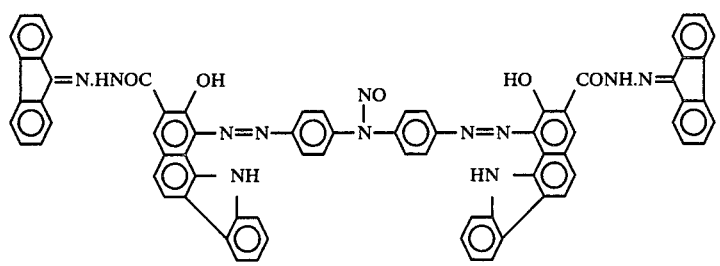
2-(32)
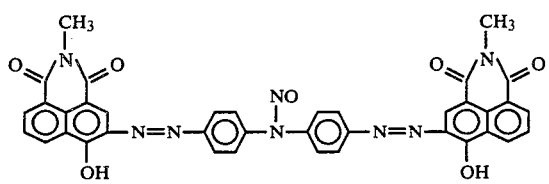
2-(33)
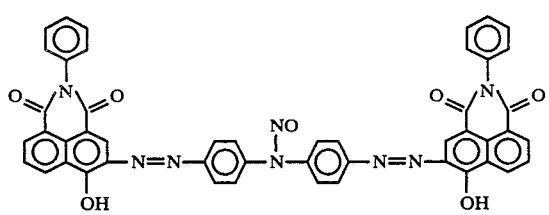
2-(34)
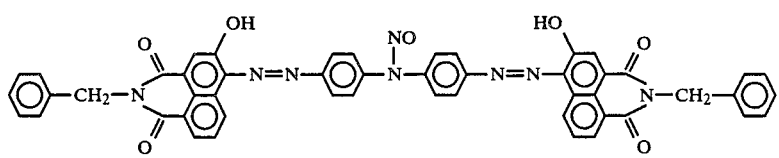
2-(35)
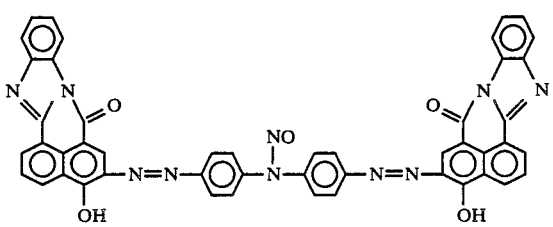
2-(36)
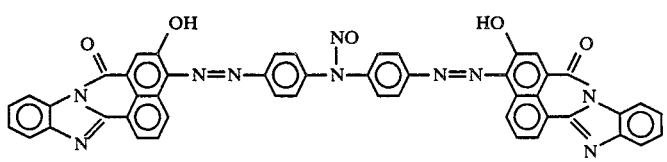

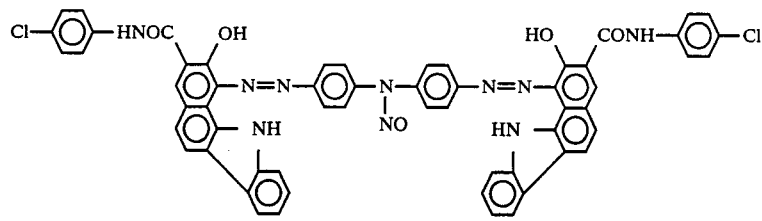
2-(37)
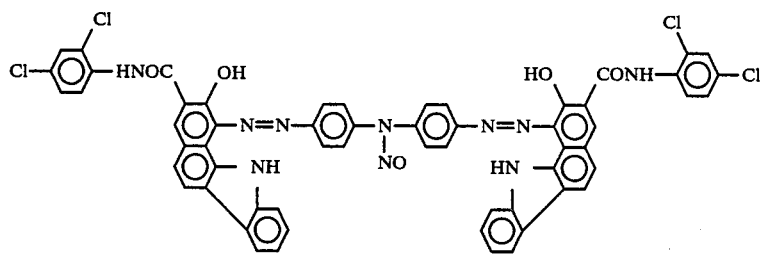
2-(38)
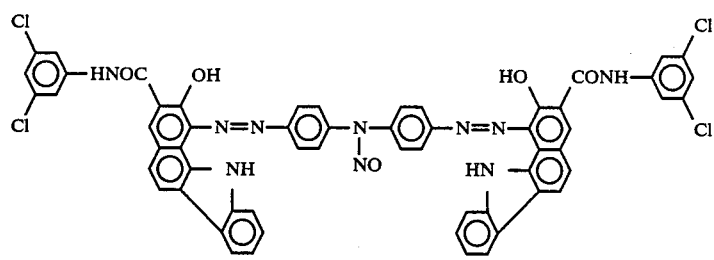
2-(39)
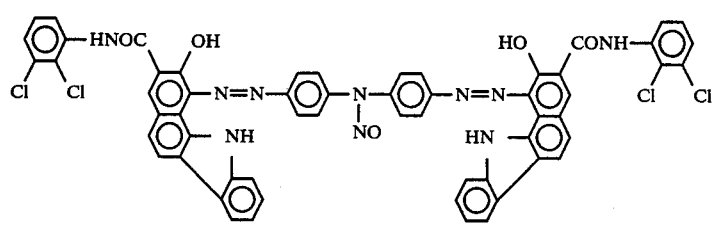
2-(40)
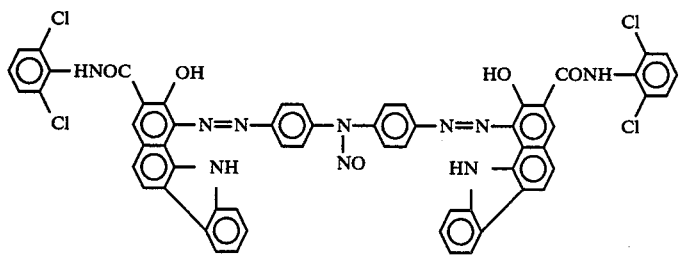
2-(41)
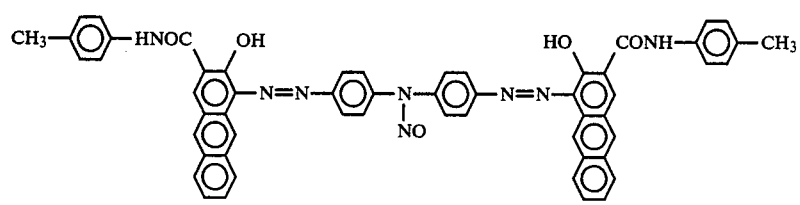
2-(42)
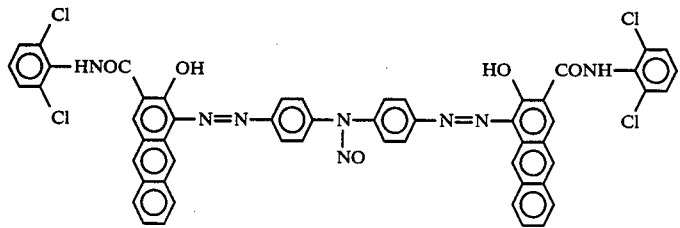
2-(43)

-continued
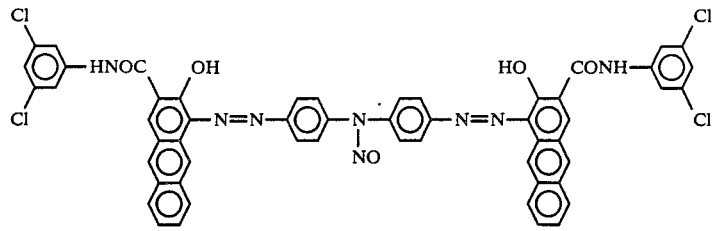
2-(44)
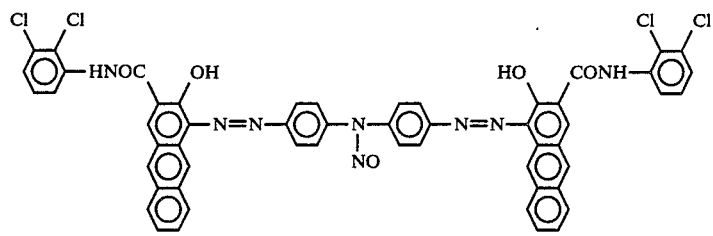
2-(45)
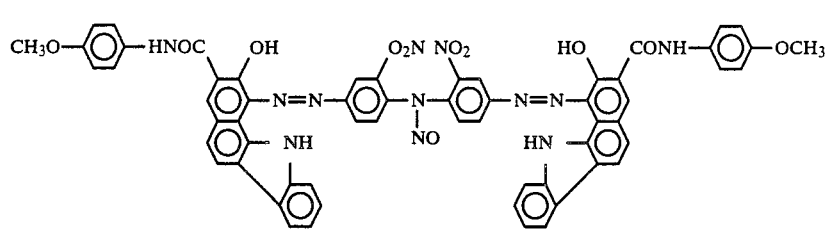
2-(46)
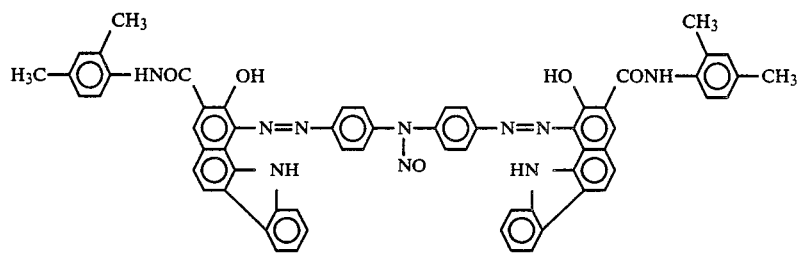
2-(47)
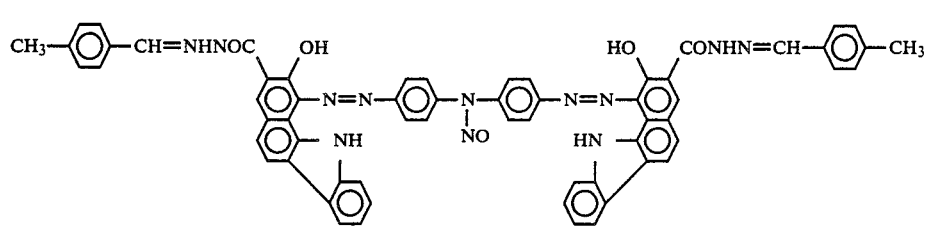
2-(48)
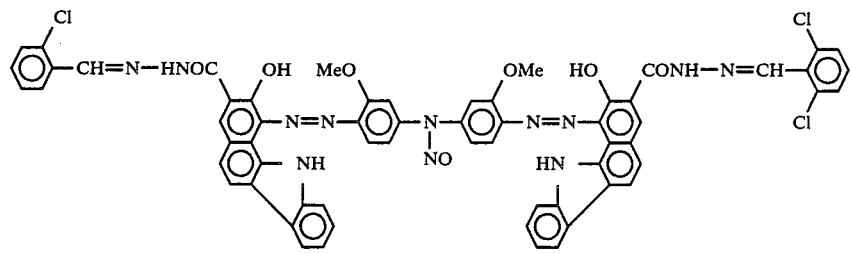
2-(49)
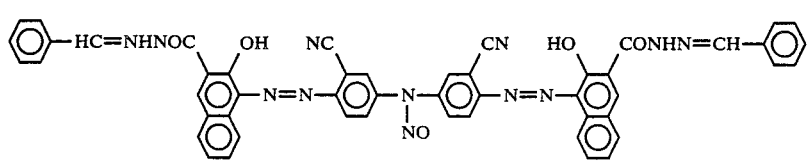
2-(50)

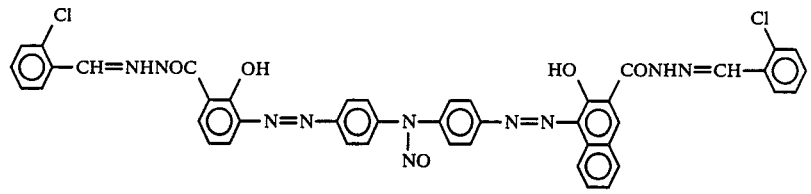
2-(51)
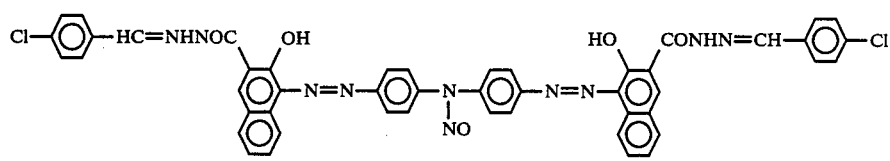
2-(52)
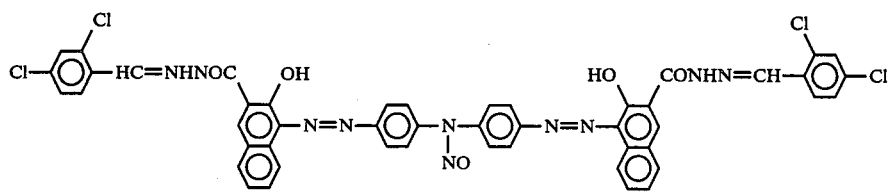
2-(53)
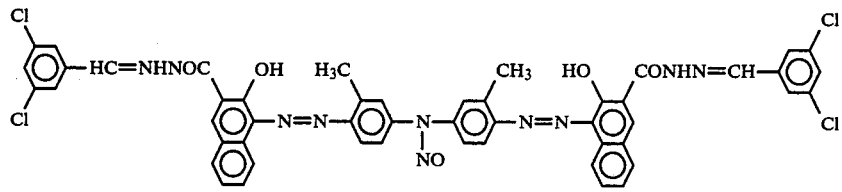
2-(54)
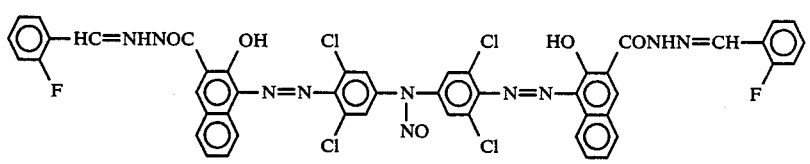
2-(55)
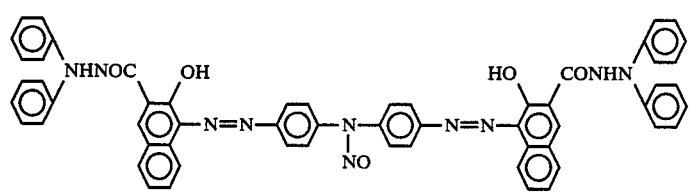
2-(56)
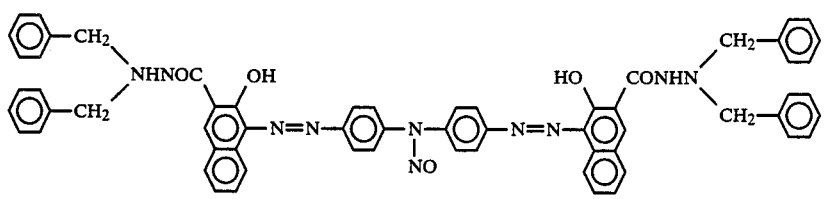
2-(57)
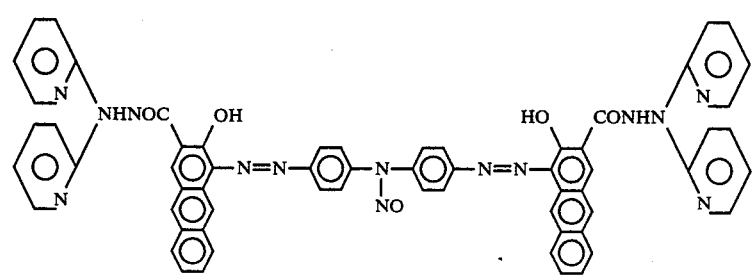
2-(58)

-continued
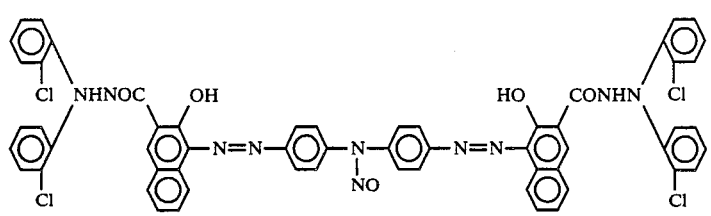 2-(59)
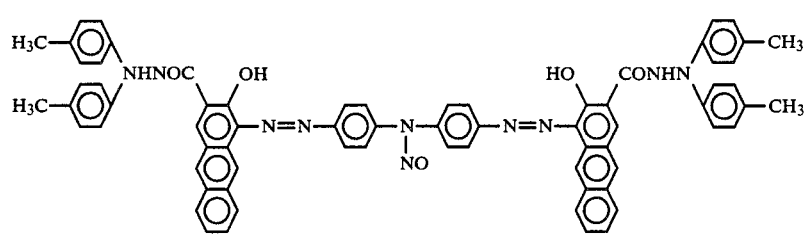 2-(60)
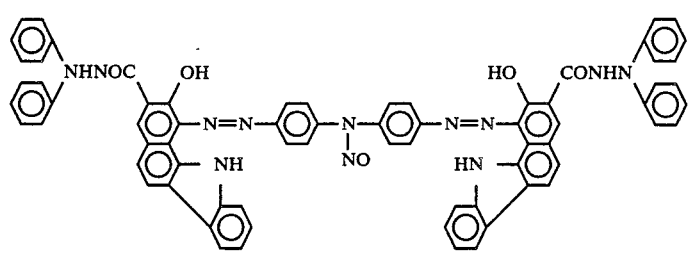 2-(61)
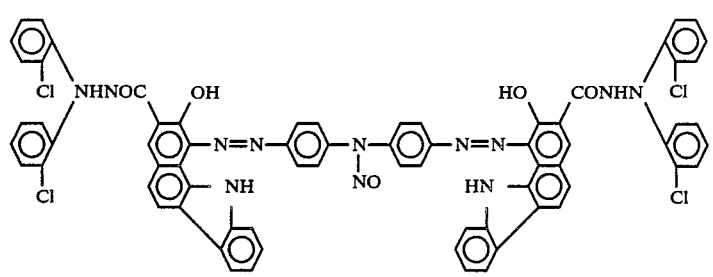 2-(62)
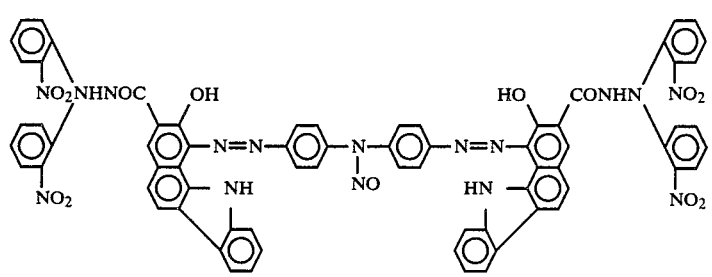 2-(63)
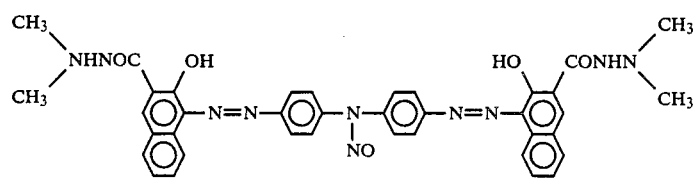 2-(64)

-continued 2-(65)

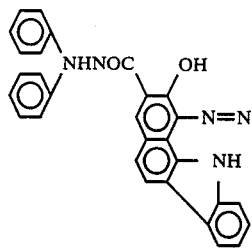 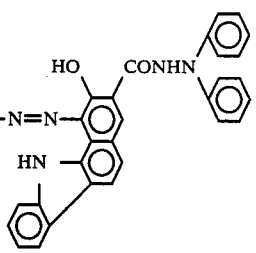

These disazo pigments can be used either singly or as a combination of two or more pigments.

These pigments can be prepared easily by, for example, subjecting a diamine having a secondary amine represented by the formula:

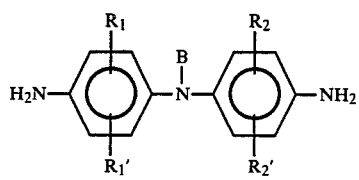

(9)

wherein $R_1$, $R_1'$, $R_2$, $R_2'$ and B have the same meanings as the symbols in the formula (1), to tetrazotization in the ordinary manner, then carrying out aqueous system coupling of the corresponding coupler in the presence of an alkali, or isolating once a tetrazonium salt of the above diamine in the form of borofluoride or zinc chloride double salt with the tetrazonium salt of the above diamines before coupling with a coupler in an appropriate solvent such as N,N-dimethylformamide, dimethyl sulfoxide, etc. in the presence of an alkali.

In the following, a typical example of synthesis of the disazo pigment to be used in the present invention is shown.

SYNTHETIC EXAMPLE 1

[Synthesis of the Above Exemplary Disazo Pigment No. 1-(1)]

A 500 ml beaker was charged with 80 ml of water and 16.6 ml (0.19 mole) of conc. hydrochloric acid and, while cooling on an ice-water bath, 5.7 g (0.029 mole) of an amine:

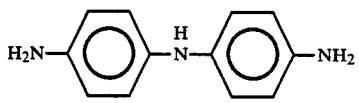

was added thereto under stirring and the liquid temperature was maintained at 3° C. Next, a solution of 4.1 g (0.060 mole) of sodium nitrite dissolved in 7 ml of water was added dropwise over 10 minutes while controlling the liquid temperature to the range of 3° to 10° C., and the mixture was stirred at the same temperature for additional 30 minutes after completion of the dropwise addition. The reaction mixture was filtered with addition of carbon to obtain a tetrazotized mixture.

As the next step, a 2 liter beaker was charged with 700 ml of dimethylformamide and 53.6 g (0.53 mole) of triethylamine was added, followed by addition of 19.1 g (0.061 mole) of 3-hydroxy-2-anthracenecarboxylic acid anilide to be dissolved therein.

The resultant coupler solution was cooled to 6° C. and, while controlling the liquid temperature at 6° to 10° C., the above tetrazotized mixture was added dropwise under stirring over 30 minutes, and then stirred at room temperature for 2 hours, followed further by leaving to stand overnight. The reaction mixture was filtered, washed with water and filtered to obtain 21.3 g (as solid) of a crude pigment as water paste. Then, by use of 400 ml of N,N-dimethylformamide, stirring and filtration were repeated four times at room temperature. Then, after repeating stirring and filtration twice, respectively, with 400 ml of methyl ethyl ketone, followed by drying under reduced pressure at room temperature, 20.9 g of a purified pigment was obtained. The yield was 85.0%. m.p. >250°.

| Elemental analysis | Calcd. (%) | Found (%) |
|---|---|---|
| C | 76.50 | 76.42 |
| H | 4.40 | 4.37 |
| N | 11.56 | 11.62 |

SYNTHETIC EXAMPLE 2

[Synthesis of the Above Exemplary Disazo Pigment No. 2-(1)]

A 500 ml beaker was charged with 80 ml of water and 16.6 ml (0.19 mole) of conc. hydrochloric acid and, while cooling on an ice-water bath, 5.7 g (0.029 mole) of an amine:

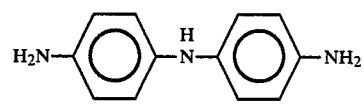

was added thereto under stirring and the liquid temperature was maintained at 3° C. Next, a solution of 6.2 g (0.090 mole) of sodium nitrite dissolved in 7 ml of water was added dropwise over 10 minutes while controlling the liquid temperature to the range of 3° to 10° C., and the mixture was stirred at the same temperature for additional 30 minutes after completion of the dropwise addition. The reaction mixture was filtered with addition of carbon to obtain a tetrazotized mixture.

As the next step, a 2 liter beaker was charged with 700 ml of dimethylformamide and 53.6 g (0.53 mole) of triethylamine was added, followed by addition of 19.1 g (0.061 mole) of 3-hydroxy-2-anthracenecarboxylic acid anilide to be dissolved therein.

The resultant coupler solution was cooled to 6° C. and, while controlling the liquid temperature at 6° to 10° C., the above tetrazotized mixture was added dropwise under stirring over 30 minutes, and then stirred at room temperature for 2 hours, followed further by leaving to stand overnight. The reaction mixture was filtered, washed with water and filtered to obtain 22.8 g (as solid) of a crude pigment as water paste.

Then, by use of 400 ml of N,N-dimethylformamide, stirring and filtration were repeated four times at room temperature. Then, after repeating stirring and filtration twice, respectively, with 400 ml of methyl ethyl ketone, followed by drying under reduced pressure at room temperature, 21.5 g of a purified pigment was obtained. The yield was 84.6%. m.p. >250°.

| Elemental analysis | Calcd. (%) | Found (%) |
| --- | --- | --- |
| C | 73.97 | 73.95 |
| H | 4.11 | 4.10 |
| N | 12.79 | 12.77 |

Having described above about the synthetic method of typical pigments, other disazo pigments represented by the formula (1) can also similarly be synthesized.

The coating containing the disazo pigment as described above exhibits photoconductivity and can be used for the photosensitive layer in the electrophotographic photosensitive member as described below.

That is, according to a typical embodiment of the present invention, an electrophotographic photosensitive member can be prepared by forming a coating of a disazo pigment as described above by the vacuum vapor deposition method on an electroconductive substrate, or by forming a coating of the disazo pigment dispersed in a suitable binder.

According to a preferable example of the present invention, the photosensitive layer of the electrophotographic member is separated in function into the charge generation layer and the charge transport layer, and the photoconductive coating as described above can be applied as the charge generation layer of the electrophotographic photosensitive member.

The charge generation layer contains a compound exhibiting photoconductivity as mentioned above in an amount as much as possible in order to obtain sufficient light absorbance, and is preferably made of a thin film, having a thickness of, for example, 5µ or less, preferably 0.01 to 1µ, in order to make the flight length of the charge carriers generated. This is attributable to the fact that most of the quantity of incident light is absorbed by the charge generation layer to generate much charge carriers and further that the charge carriers generated are required to be injected into the charge transport layer without deactivation by recombination or trap.

The charge generation layer can be formed by dispersing the above compound in a suitable binder and applying the dispersion on the above substrate by way of coating, and it can also be obtained by forming a vapor deposited film by means of a vacuum vapor deposition device. The binder which can be used in formation of the charge generation layer by way of coating can be selected from a wide variety of insulating resins, and also from organic photoconductive polymers such as poly-N-vinylcarbazole, polyvinylanthracene, polyvinylpyrene, etc. Preferably, there may be employed insulating resins such as polyvinyl butyral, polyalylate (e.g. condensed polymer of binsphenol A and phthalic acid), polycarbonate, polyester, phenoxy resin, polyvinyl acetate, acrylic resin, polyacrylamide resin, polyamide, polyvinyl pyridine, cellulose type resin, urethane resin, epoxy resin, casein, polyvinyl alcohol, polyvinyl pyrrolidone, etc. The amount of the resin contained in the charge generation layer may suitably be 80% by weight or less, preferably 40% by weight or less.

The solvent used for dissolving these resins differs depending on the resin employed and is also preferably selected from those which do not dissolve the charge transport layer and the subbing layer as described below. Typical examples of organic solvents may include alcohols such as methanol, ethanol, isopropanol and the like; ketones such as acetone, methyl ethyl ketone, cyclohexanone and the like; amides such as N,N-dimethylformamide, N,N-dimethylacetamide and the like; sulfoxides such as dimethyl sulfoxide and the like; ethers such as tetrahydrofuran, dioxane, ethylene glycol monomethyl ether and the like; esters such as methyl acetate, ethyl acetate and the like; aliphatic halogenated hydrocarbons such as chloroform, methylene chloride, dichloroethylene, carbon tetrachloride, trichloroethylene and the like; aromatics such as benzene, toluene, xylene, ligroin, monochlorobenzene, dichlorobenzene and the like; and so on.

Coating can be practiced by dip coating, spray coating, spinner coating, bead coating, Meyer bar coating, blade coating, roller coating, curtain coating, etc. Drying is preferably conducted by way of finger touch drying at room temperatures, followed by heating drying. Heating drying can be conducted at a temperature of 30° C. to 200° C., for 5 minutes to 2 hours, either under stationary state or under air blowing.

The charge transport layer is electrically connected to the charge generation layer as described above, has the function of receiving charge carriers injected from the charge generation layer in the presence of an electrical field and transporting these charge carriers to the surface. The charge transport layer may be laminated either on the charge generation layer or beneath thereof. When the charge transport layer is formed on the charge generation layer, the substance for transporting the charge carriers in the charge transport layer (hereinafter referred to merely as charge transport substance) is preferably substantially non-sensitive to the wavelength region of the electromagnetic wave to which the cahrge generation layer as described above is sensitive. The "electromagnetic wave" as herein mentioned is inclusive of "light rays" in a broad sense, including γ-ray, X-ray, UV-ray, visible ray, near IR-ray, IR-ray and far IR-ray. When the light-sensitive wavelength region of the charge transport layer coincides with or overlaps that of the charge generation layer, the charge carriers generated in both layers will trap each other, to result in lowering of sensitivity.

The charge transport material may include electron transport substances and positive hole transport substances. Examples of electron transport substances are electron attracting substances such as chloranil, bromoanil, tetracyanoethylene, tetracyanoquinodimethane, fluorenones such as 2,4,7-trinitro-9-fluorenone, 2,4,5,7-tetranitro-9-fluorenone and 2,4,7-trinitro-9-dicyanomethylenefluorenone and the like; 2,4,5,7-tetranitroxanthone, 2,4,8-trinitrothioxanthone, etc. or polymers formed from these electron attracting substances.

Examples of positive hole transport substances include pyrene, N-ethylcarbazole, N-isoproylcarbazole, N-methyl-N-phenylhydrazino-3-methylidene-9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine, hydrazones such as p-diethylaminobenzaldehyde-N,N-diphenylhydrazone, p-diethylaminobenzaldehyde-N-α-naphthyl-N-phenyl-hydrazone, p-pyrrolidinobenzaldehyde-N,N-diphenyl-hydrazone, 1,3,3-trimethylindolenine-ω-aldehyde-N,N-diphenylhydrazone, p-diethylbenzaldehyde-3-methyl-benzthiazolinone-2-hydrozone and the like, 2,5-bis(p-diethylaminophenyl)-1,3,4-oxadiazole, pyrazolines such as 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)-pyrazoline, 1-[pyridyl(2)]-3-(p-diethylaminostyryl)-5-(p-diethylaminophenyl)pyrazoline, 1-[6-methoxy-pyridyl(2)]-3-(p-diethylaminostyryl)-5-(p-diethylaminophenyl)-pyrazoline, 1-[pyridyl(3)]-3-(p-diethylaminostyryl)-5-(p-diethylaminophenyl)pyrazoline, 1-[lepidyl(2)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-[pyridyl-(2)]-3-(α-methyl-p-diethylaminostyryl)-5-(p-diethylaminophenyl)-pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoline, spiropyrazoline and the like, oxazole compounds such as 2-(p-diethylaminostyryl)-6-diethylaminobenzoxazole, 2-(p-diethylaminophenyl)-4-(p-dimethylaminophenyl)-5-(2-chlorophenyl)oxazole and the like, thiazole compounds such as 2-(p-diethylaminostyryl)-6-diethylaminobenzothiazole and the like, triarylmethane compounds such as bis(4-diethylamino-2-methylphenyl)phenylmethane and the like, polyaryl alkanes such as 1,1-bis(4-N,N-diethylamino-2-methylphenyl)heptane, 1,1,2,2-tetrakis(4-N,N-dimethylamino-2-methylphenyl)ethane and the like, triphenylamine, poly-N-vinylcarbazole, polyvinylpyrene, polyvinylanthracene, polyvinylacridine, poly-9-vinyl-phenylanthracene, pyrene-formaldehyde resin, ethylcarbazole-formaldehyde resin, etc.

Other than these organic charge transport substances, inorganic materials such as selenium, selenium-tellurium amorphous silicon, cadmium sulfide may also be used.

Further, these charge transport substances can be used either singly or as a combination of two or more compounds.

When the charge transport substance has no film forming property, coating can be formed by selection of a suitable binder. The resin which can be used as the binder may include, for example, insulating resins such as acrylic resin, polyalylate, polyester, polycarbonate, polystyrene, acrylonitrile-styrene copolymer, acrylonitrile-butadiene copolymer, polyvinyl butyral, polyvinyl formal, polysulfone, polyacrylamide, polyamide, chlorinated rubber and the like, or organic photoconductive polymers such as poly-N-vinylcarbazole, polyvinylanthracene, polyvinylpyrene, etc.

The charge transport layer cannot be made thicker than need be, because there is the limit of thickness which can transport charge carriers. The thickness is generally 5 to 30μ, preferably within the range from 8 to 20μ. In forming the charge transport layer by coating, a suitable coating method as described above can be employed.

The photosensitive layer comprising such a laminated structure of charge generation layer and charge transport layer is provided on a substrate having an electroconductive layer. The substrate having an electroconductive layer may include those in which the substrate itself has electroconductivity, such as aluminum, aluminum alloys, copper, zinc, stainless steel, vanadium, molybdenum, chromium, titanium, nickel, indium, gold, platinum, etc., or otherwise plastics (e.g. polyethylene, polypropylene, polyvinyl chloride, polyethylene terephthalate, acrylic resin, polyfluoroethylene, etc.) having a layer of aluminum, aluminum alloys, indium oxide, tin oxide, indium oxide-tin oxide alloys, etc. coated by the vaccum vapor deposition method thereon, substrates of plastics or the above electroconductive substrate coated with electroconductive particles (e.g. aluminum powder, tin oxide, zinc oxide, titanium oxide, carbon black, silver particles, etc.) in a suitable binder, substrates of plastics or papers impregnated with electroconductive particles, or plastics having electroconductive polymers, etc.

Between the electroconductive layer and the photosensitive layer, a subbing layer having the barrier function and the adhesive function can also be provided. The subbing layer can be formed of casein, polyvinyl alcohol, nitrocellulose, ethylene-acrylic acid copolymer, poliamide (nylon 6, nylon 66, nylon 610, copolymerized nylon, alkoxymethylated nylon), polyurethane, gelatin, aluminum oxide, etc.

The film thickness of the subbing layer may be suitably 0.1 to 5μ, preferably 0.5 to 3μ.

In the case of using a photosensitive member having an electroconductive layer, a charge generation layer and a charge transport layer in the order stated, when the charge transport substance comprises an electron transportable substance, the surface of the charge transport layer is required to be changed positively. When exposure is effected after charging, the electrons generated in the charge generation layer at the exposed portion are injected into the charge transport layer, and thereafter reach the surface where the positive charges are neutralized to cause decay of the surface potential, whereby electrostatic contrast can be created between the exposed and the unexposed portions. The electrostatic latent image thus formed is developed with a negatively chargeable toner to give a visible image. This can be directly fixed, or develped after transfer of the toner image onto a paper or a plastic film, followed by fixing.

It is also possible to employ the method in which the electrostatic latent image is transferred onto an insulating layer such as transfer paper and then developed, followed by fixing. The developing agent, the developing method and the fixing method used may be any of those known in the art, and will not be limited to particular ones.

On the other hand, when the charge transport substance comprises a positive hole transport substance, the charge transport layer surface is required to be negative charged. When exposure is effected after charging, the positive holes generated in the charge generation layer at the exposed portion are injected into the charge transport layer and thereafter reach the surface to neutralize the negative charges, whereby decay of the surface potential is caused to create an electrostatic contrast between the exposed and the unexposed portions. During development, it is necessary to use a positively chargeable toner, as contrary to the case of using an electron transportable substance.

In the case of using a photosensitive member having an electroconductive layer, a charge transport layer and a charge generation layer in the order stated, when the charge transport substance comprises an electron transportable substance, the surface of the charge generation layer is required to be charged negatively. When exposure is effected after charging, the electrons generated in the charge generation layer at the exposed portion are injected into the charge transport layer, and thereafter reach the substrate. On the other hand, the positive holes generated in the charge generation layer reach the surface to cause decay of the surface potential, whereby electrostatic contrast is created between the exposed and unexposed portions. the electrostatic latent image thus formed is developed with a positively chargeable toner to give a visible image. This can be directly fixed or developed after transfer of the toner image onto a paper or a plastic film, followed by fixing. It is also possible to employ the method in which the electrostatic latent image is transferred onto an insulating layer of transfer paper and then developed, followed by fixing. The developing agent, the developing method and the fixing method used may be any of those known in the art, and will not be limited to particular ones.

On the other hand, when the charge generation layer comprises a positive hole transport substance, the charge generation layer surface is required to be positively charged. When exposure is effected after charging, the positive holes generated in the charge generation layer at the exposed portion are injected into the charge transport layer and thereafter reach the substrate. On the other hand, electrons generated in the charge generation layer reach the surface to cause decay of the surface potential, whereby an electrostatic contrast is created between the exposed and the unexposed portions. During development, it is necessary to use a negatively chargeable toner, as contrary to the case of using an electron transportable substance.

According to another embodiment of the present invention, a photosensitive coating can be formed incorporating a disazo pigment as described above as the sensitizer for organic photoconductive substances as mentioned above such as hydrazones, pyrazolines, oxazoles, thiazoles, triarylmethanes, polyarylalkanes, triphenylamine, poly-N-vinylcarbazoles, etc. or inorganic photoconductive substances such as zinc oxide, cadmium sulfide, selenium, etc. The photosensitive coating can be formed by way of coating of these photoconductive substances and the disazo pigment as described above together with a binder.

As still another embodiment of the present invention, there may be employed an electrophotographic photosensitive member incorporating the disazo pigment as described above together with the charge transport substance in the same layer. In this case, other than the charge transport substance as described above, charge transfer complex compounds comprising poly-N-vinylcarbazole and trinitrofluorenone can be used. The electrophotographic photosensitive member according to this embodiment can be prepared by dispersing the above-mentioned disazo pigment and the charge transfer complex compounds in a polyester solution dissolved in tetrahydrofuran, followed by coating formation.

In any of the photosensitive members, the pigment used is at least one kind of pigment selected from the disazo pigments represented by the formula (1) and its crystal form may be either amorphous or crystalline. If desired, pigments with different light absorption can be used in combination to enhance the sensitivity of the photosensitive member, or two or more kinds of the disazo pigments represented by the formula (1) can be combined for the purpose of obtaining a panchromatic photosensitive member, etc. Further, it is also possible to use charge generation substances selected from known dyes and pigments in combination with the disazo pigments.

The electrophotographic photosensitive member of the present invention can be utilized not only for electrophotographic copying machine but also widely for electrophotography utilizing fields such as laser printer, CRT printer, LED printer, liquid crystal printer, laser printing plate, etc.

The present invention is described by referring to the following Examples.

EXAMPLES 1—1 to 1-40

An aluminum plate was coated with an aqueous ammoniacal solution of casein (casein 11.2%, ammonia water 1 g, water 222 ml) by a Meyer bar to a film thickness after drying of 1.0μ, followed by drying.

Next, 5 g of the above exemplary disazo pigment No. 1—1 was added into a solution of 2 g of a butyral resin (degree of butylation, 63 mole %) dissolved in 95 ml of ethanol and dispersed in a sand mill for 2 hours. The dispersion was applied by a Meyer bar on the casein layer previously formed to a film thickness after drying of 0.5μ, followed by drying, to form a charge generation layer. Subsequently, 5 g of a hydrazone compound of the following formula:

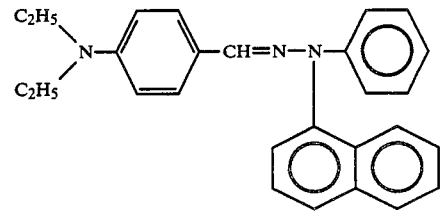

and 5 g of a polymethyl methacrylate resin (number average molecular weight: 100,000) were dissolved in 70 ml of benzene, and the resultant solution was applied by a Meyer bar on the charge generation layer to a film thickness after drying of 12μ, followed by drying, to form a charge transport layer. Thus, a photosensitive member of Example 1—1 was prepared. According to entirely the same procedure except for using the exemplary pigments shown in Table 1 in place of the disazo pigment No. 1—1, photosensitive members corresponding to Examples 1-2 to 1-40 were prepared.

The electrophotographic photosensitive members thus prepared were subjected to corona charging at ⊖ 5 kV according to the static system by means of an electrostatic copying paper testing device Model SP-428 produced by Kawaguchi Denki K. K., maintained in a dark place for one second and thereafter exposed at a illumination intensity of 2 lux for examination of charging characteristics.

As the charging characteristics, the surface potential (Vo) and the exposure quantity necessary for decaying the potential when subjected to dark decay for one second to ½ ($E_{\frac{1}{2}}$) were measured. The results are shown in Table 1—1.

TABLE 1-1

| Example | Exemplary disazo pigment No. | Vo (−V) | $E_{\frac{1}{2}}$ (l · s) |
| --- | --- | --- | --- |
| 1-1 | 1-1 | 560 | 4.0 |
| 1-2 | 1-2 | 600 | 3.2 |
| 1-3 | 1-3 | 580 | 2.9 |
| 1-4 | 1-4 | 570 | 3.0 |

TABLE 1-1-continued

| Example | Exemplary disazo pigment No. | Vo (−V) | $E_{\frac{1}{2}}$ (l · s) |
|---|---|---|---|
| 1-5 | 1-5 | 600 | 2.6 |
| 1-6 | 1-6 | 580 | 2.8 |
| 1-7 | 1-7 | 600 | 2.4 |
| 1-8 | 1-8 | 610 | 3.3 |
| 1-9 | 1-9 | 600 | 2.6 |
| 1-10 | 1-10 | 620 | 2.6 |
| 1-11 | 1-11 | 610 | 2.7 |
| 1-12 | 1-12 | 590 | 2.9 |
| 1-13 | 1-13 | 590 | 4.3 |
| 1-14 | 1-14 | 610 | 4.1 |
| 1-15 | 1-15 | 570 | 3.2 |
| 1-16 | 1-16 | 570 | 2.9 |
| 1-17 | 1-18 | 600 | 2.6 |
| 1-18 | 1-19 | 590 | 2.4 |
| 1-19 | 1-20 | 570 | 3.8 |
| 1-20 | 1-21 | 580 | 3.2 |
| 1-21 | 1-22 | 610 | 3.8 |
| 1-22 | 1-23 | 620 | 3.6 |
| 1-23 | 1-24 | 580 | 3.6 |
| 1-24 | 1-25 | 570 | 2.9 |
| 1-25 | 1-26 | 610 | 2.0 |
| 1-26 | 1-27 | 590 | 2.0 |
| 1-27 | 1-28 | 590 | 1.8 |
| 1-28 | 1-29 | 610 | 1.8 |
| 1-29 | 1-30 | 570 | 2.2 |
| 1-30 | 1-31 | 610 | 2.4 |
| 1-31 | 1-32 | 590 | 2.4 |
| 1-32 | 1-33 | 580 | 4.3 |
| 1-33 | 1-34 | 610 | 2.6 |
| 1-34 | 1-35 | 610 | 1.8 |
| 1-35 | 1-36 | 600 | 1.8 |
| 1-36 | 1-37 | 580 | 2.4 |
| 1-37 | 1-38 | 575 | 1.7 |
| 1-38 | 1-39 | 590 | 2.0 |
| 1-39 | 1-40 | 600 | 2.8 |
| 1-40 | 1-41 | 610 | 2.5 |

COMPARATIVE EXAMPLES 1—1 to 1-5

Comparative pigment 1-(1) was prepared.

In place of exemplary disazo pigment 1-(1), an azo pigment having the coupler structure:

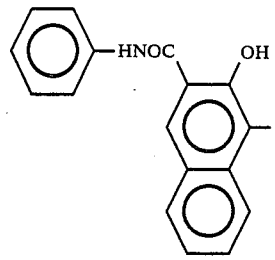

was used as comparative pigment 1-(1). Next, in place of exemplary disazo pigments 1-(3), 1-(4), 1-(18) and 1-(20), pigments having the central skeletons of the formulas:

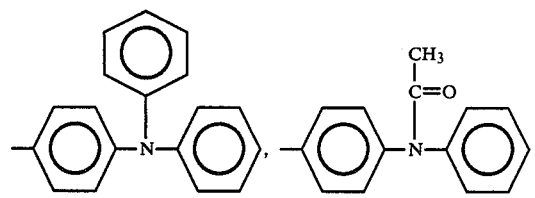

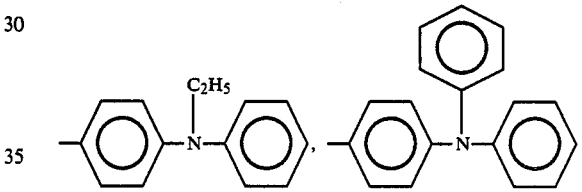

were used, respectively, as comparative pigments 1-(2) to 1-(5).

Comparative pigments

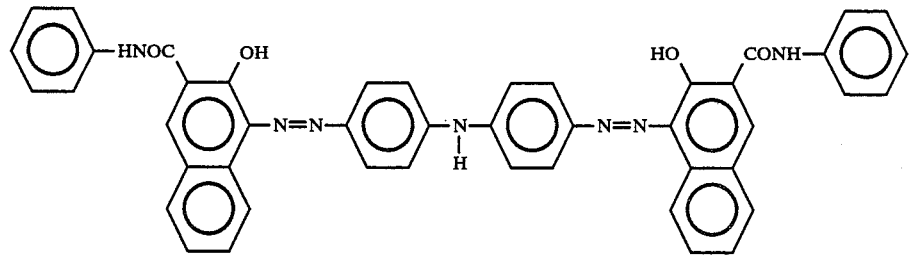

1-1.

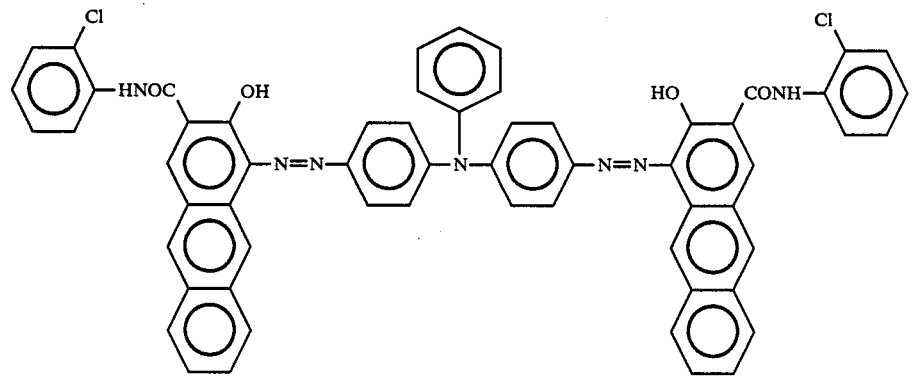

1-2.

-continued

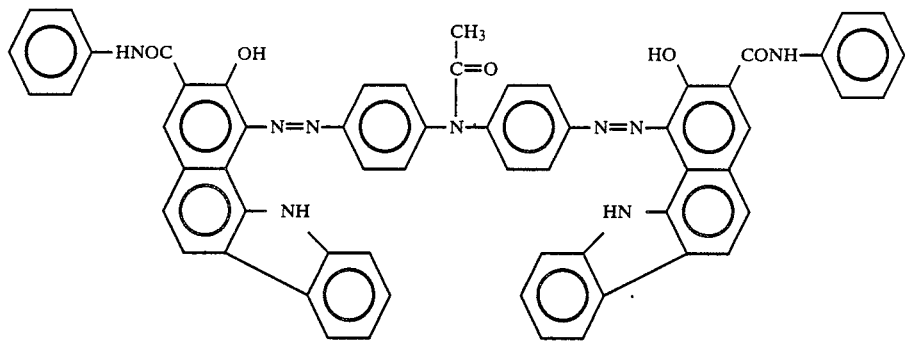
1-3.

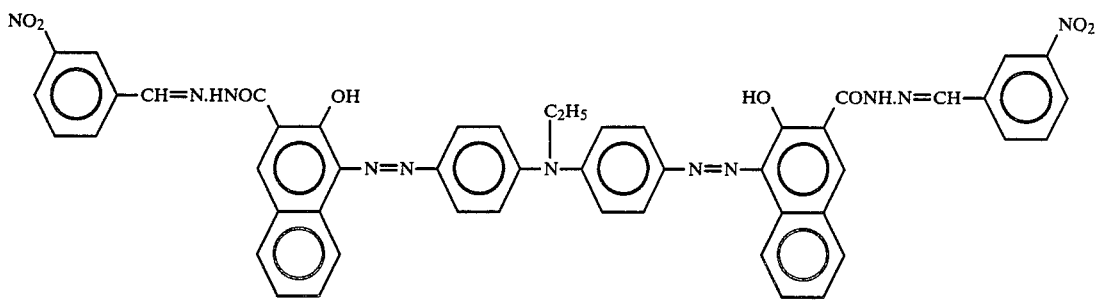
1-4.

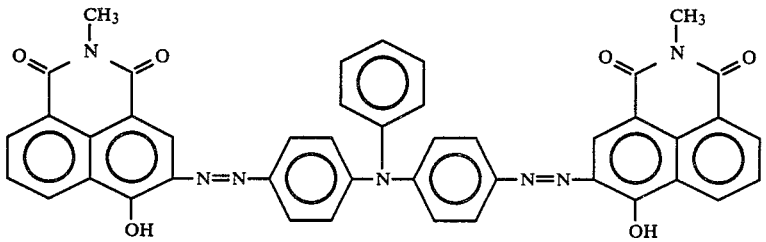
1-5.

Photosensitive members were prepared in the same manner as that in Example 1—1 except for using comparative pigments 1—1 to 1-5 in place of the pigment of Example 1—1, and the charging properties were measured.

Table 1-2 shows the properties of comparative examples while compared with this invention.

tential at light portion and potential at dark portion were measured during repeated uses by means of an electrophotographic copying machine equipped with a ⊖ 5.6 kV corona charger, an exposure optical system, a developer, a transfer charger, an deelectrifying exposure optical system and a cleaner, in which the photosensitive member was attached on its cylinder. The

TABLE 1-2

| Example* | Exemplary pigment No. | $V_o$ (−V) | $E_{\frac{1}{2}}$ (lux · sec) | Comparative example | Comparative pigment No. | $V_o$ (−V) | $E_{\frac{1}{2}}$ (lux · sec) |
|---|---|---|---|---|---|---|---|
| 1-1 | 1-1 | 560 | 4.0 | 1-1 | 1-1 | 590 | 7.7 |
| 1-3 | 1-3 | 580 | 2.9 | 1-2 | 1-2 | 570 | 15.2 |
| 1-4 | 1-4 | 570 | 3.0 | 1-3 | 1-3 | 580 | 8.2 |
| 1-17 | 1-18 | 600 | 2.6 | 1-4 | 1-4 | 590 | 8.8 |
| 1-19 | 1-20 | 570 | 3.8 | 1-5 | 1-5 | 580 | 17.2 |

*Excerpted from Table 1-1

As clear from the results in Table 1-2, the photosensitive member of this invention is remarkably improved in the electrophotographic sensitivity in comparison with the cases of using the pigments of the structure wherein the "H" of >NH of the central skelton is substituted, or the pigments of the structure wherein the coupler structure is a 3-hydoxynaphthalenecarboxylic acid anilide type. Examples 1-41 to 1-45, and Comparative Examples 1-6 to 1-10

By use of the photosensitive members used in Examples 1—1, 1-3, 1-4, 1-17 and 1-19 and those used in Comparative examples 1—1 to 1-5, fluctuations in pocopying machine is constituted such that an image is obtained on a transfer paper with driving of the cylinder. By use of this copying machine, the initial potentials at light portion ($V_L$) and at dark portion ($V_D$) were set at around −100 V and −600 V, respectively, and the potentials at light portion ($V_L$) and at dark portion ($V_D$) after repeated uses of 5000 times were measured. The results are shown in Table 1-3.

TABLE 1-3

| Photosensitive member No. | | Initial values | | After 5000 sheet copying | |
|---|---|---|---|---|---|
| | | $V_D(-V)$ | $V_L(-V)$ | $V_D(-V)$ | $V_L(-V)$ |
| Example | Example | | | | |
| 41 | 1 | 600 | 100 | 620 | 120 |
| 42 | 3 | 590 | 100 | 630 | 120 |
| 43 | 4 | 590 | 110 | 630 | 130 |
| 44 | 17 | 600 | 90 | 610 | 110 |
| 45 | 19 | 610 | 100 | 620 | 130 |
| Comparative example | Comparative Example | | | | |
| 6 | 1 | 600 | 100 | 670 | 170 |
| 7 | 2 | 600 | 100 | 680 | 160 |
| 8 | 3 | 590 | 90 | 660 | 160 |
| 9 | 4 | 600 | 100 | 690 | 180 |
| 10 | 5 | 610 | 100 | 700 | 190 |

The photosensitive members of this invention were very excellent in the stability of $V_D$ and $V_L$ even during the repetitive uses.

EXAMPLE 1-46

On the charge generation layer prepared in Example 1—1, a coating solution prepared by dissolving 5 g of 2,4,7-trinitro-9-fluorenone and 5 g of poly-4,4'-dioxydiphenyl-2,2'-propane carbonate (molecular weight 300,000) in 70 ml of tetrahydrofuran was applied to a coated amount after drying of 10 g/m², followed by drying to form a charge transport layer.

The electrophotographic photosensitive member thus prepared was subjected to measurement of charging properties according to the same method as in Example 1—1. The charging polarity was made ⊕. The results are shown in Table 1-4.

TABLE 1-4

| Vo | ⊕ 570 volt |
|---|---|
| $E_{\frac{1}{2}}$: | 5.0 lux · sec |

EXAMPLE 1-47

On the aluminum surface of a polyethylene terephthalate film having aluminum vapor deposited thereon, a coating of a polyvinyl alcohol with a film thickness of 0.5μ was formed.

Next, on the polyvinyl alcohol layer previously formed, the dispersion containing the disazo pigment used in Example 1—1 was applied by a Meyer Bar to a film thickness after drying of 0.5μ, followed by drying, to form a charge generation layer.

Subsequently, a solution of 5 g of a pyrazoline compound of the formula:

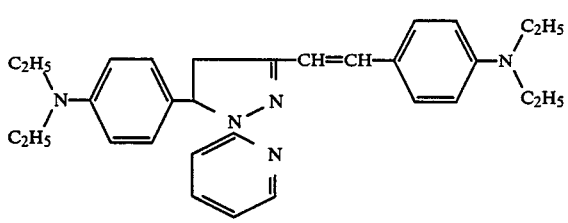

and 5 g of a polyalylate resin (condensed polymer of bisphenol A and terephthalic acid-isophthalic acid) dissolved in 70 ml of tetrahydrofuran was applied on the charge generation layer to a film thickness after drying of 10μ, followed by drying, to form a charge transport layer.

The charging characteristics and durability characteristics of the photosensitive member thus prepared were measured in the same manner as Example 1—1 and Example 1-41. The results are shown in Table 1-5.

TABLE 1-5

| Vo: −600 V | | | |
|---|---|---|---|
| $E_{\frac{1}{2}}$: 4.5 lux · sec | | | |
| Durability characteristics: | | | |
| Initial | | After 5000 sheet copying | |
| $V_D$ | $V_L$ | $V_D$ | $V_L$ |
| −600 V | −100 V | −620 V | −125 V |

From the results shown in Table 1-5, the photosensitive member of the present invention has good sensitivity and also good in potential stability when repeatedly used.

EXAMPLE 1-48

An aluminum plate with a thickness of 100 microns was coated with an aqueous ammoniacal solution of casein, followed by drying, to form a subbing layer with a film thickness of 0.5 microns.

Next, a charge transfer complex compound was formed by dissolving 5 g of 2,4,7-trinitro-9-fluorenone and 5 g of a poly-N-vinylcarbazole (number average molecular weight: 300,000) in 70 ml of tetrahydrofuran. The charge transfer compound and 1 g of the above exemplary disazo pigment No. 1-(17) were added into a solution of 5 g of a polyester resin (Byron: produced by Toyobo) dissolved in 70 ml of tetrahydrofuran to be dispersed therein. The resultant dispersion was applied on the subbing layer to a film thickness after drying of 12 microns, followed by drying.

The charging characteristics and durability characteristics of the photosensitive member thus prepared were measured in the same manner as Example 1-1. The charging polarity was made ⊕. The results are shown in Table 1-6.

TABLE 1-6

| Vo: ⊕ 560 V | | | |
|---|---|---|---|
| $E_{\frac{1}{2}}$: 5.7 lux · sec | | | |
| Durability characteristics: | | | |
| Initial | | After 5000 sheet copying | |
| $V_D$ | $V_L$ | $V_D$ | $V_L$ |
| 600 | 100 | 630 | 125 |

EXAMPLE 1-49

On the casein of the aluminum substrate applied with the casein layer used in Example 1-1, the charge transfer layer and the charge generation layer of Example 1-1 were successively laminated. Thus, a photosensitive member was prepared in entirely the same manner as Example 1-1 except for the different layer constitution, and subjected to charging measurement in the same manner as Example 1-1. However, the charging polarity was made ⊕. The results are shown in Table 1-7.

TABLE 1-7

| Vo: | ⊕ 565 V |
|---|---|
| $E_{\frac{1}{2}}$: | 5.8 lux · sec |

EXAMPLE 1-50

On an aluminum cylinder, an aqueous ammoniacal solution of casein (casein 11.2 g, 28% ammonia water 1 g, water 222 ml) was applied by dip coating, followed by drying, to form a subbing layer with a coated amount of 1.0 g/m².

Subsequently, 1 part by weight of the above disazo pigment No. 1-(4), 1 part by weight of a butyral resin (S-Lec BM-2: produced by Sekisui Kagaku K.K.) and 30 parts by weight of isopropyl alcohol were dispersed by means of a ball mill disperser for 4 hours. The resultant dispersion was applied on the subbing layer previously formed by dip coating, followed by drying, to form a charge generation layer with a thickness of 0.3 micron.

Then, 1 part by weight of the hydrazone compound used in Example 1-1, 1 part by weight of a polysulfone resin (P1700, produced by Union Carbide Co.) and 6 parts by weight of monochlorobenzene were mixed and dissolved by stirring with a stirrer. The resultant solution was applied on the charge generation layer by dip coating, followed by drying, to form a charge transport layer with a film thickness of 12 microns.

The photosensitive member thus prepared was subjected to corona discharging of ⊖5 kV. The surface potential (initial potential Vo) was measured. Further, the surface potential after leaving the photosensitive member to stand in a dark place for 5 seconds (dark decay $V_K$) was measured. The sensitivity was evaluated by measuring the exposure quantity necessary for decaying the potential $V_K$ after dark decay to ½ ($E_{\frac{1}{2}}$ microjoule/cm²). During this measurement, gallium-/aluminum/arsenic ternary system semiconductor laser (output: 5 mW; oscillation wavelength: 778 nm) was used. The results obtained are as follows.

Vo: −520 volt $V_K$: 88%

$E_{\frac{1}{2}}$: 1.5 microjoule/cm².

As the next step, real image forming test was carried out by setting the above photosensitive member in place of the LBP-CS photosensitive member on the laser beam printer (LBP-CX produced by Canon), which is an electrophotographic system printer of the reversal development system equipped with the same semiconductor laser as mentioned above. The conditions are as follows:

surface potential after primary charging: ⊖700 V; surface potential after image exposure: ⊖150 V (exposure quantity 3 μJ/cm²); transfer potential: ⊕700 V; developer polarity: negative; process speed: 50 mm/sec; developing condition (developing bias): ⊖450 V; image exposure scanning system: image scanning; exposure before primary charging: whole exposure with red light of 50 lux.sec.

Image formation was effected by performing line scanning of laser beam following the letter signals and image signals, whereby good prints of both letters and images could be obtained.

EXAMPLES 2-1 TO 2-40

Example 1-1 was repeated except that disazo pigments 2-(1) to 2-(60) were used in place of the disazo pigment No. 1-(1) to prepare corresponding photosensitive members.

The surface potential ($V_O$) and exposure quantity ($E_{\frac{1}{2}}$) of the photosensitive members were measured in the same manner as Example 1-1 to obtain the results shown in Table 2-1.

TABLE 2-1

| Example | Exemplary disazo pigment No. | Vo (−V) | $E_{\frac{1}{2}}$ (l · s) |
|---|---|---|---|
| 2-1 | 2-(1) | 570 | 4.0 |
| 2-2 | 2-(2) | 610 | 3.2 |
| 2-3 | 2-(3) | 590 | 2.9 |
| 2-4 | 2-(4) | 580 | 1.0 |
| 2-5 | 2-(5) | 610 | 2.6 |
| 2-6 | 2-(6) | 590 | 2.8 |
| 2-7 | 2-(7) | 610 | 2.4 |
| 2-8 | 2-(8) | 600 | 3.3 |
| 2-9 | 2-(9) | 610 | 2.6 |
| 2-10 | 2-(10) | 620 | 2.6 |
| 2-11 | 2-(11) | 610 | 2.7 |
| 2-12 | 2-(13) | 600 | 2.9 |
| 2-13 | 2-(16) | 600 | 4.3 |
| 2-14 | 2-(20) | 590 | 4.1 |
| 2-15 | 2-(21) | 580 | 3.2 |
| 2-16 | 2-(22) | 580 | 2.9 |
| 2-17 | 2-(28) | 610 | 2.6 |
| 2-18 | 2-(29) | 600 | 2.4 |
| 2-19 | 2-(32) | 580 | 3.8 |
| 2-20 | 2-(35) | 590 | 3.2 |
| 2-21 | 2-(38) | 600 | 3.8 |
| 2-22 | 2-(40) | 610 | 3.6 |
| 2-23 | 2-(41) | 590 | 3.6 |
| 2-24 | 2-(44) | 580 | 2.9 |
| 2-25 | 2-(45) | 600 | 2.0 |
| 2-26 | 2-(46) | 600 | 1.0 |
| 2-27 | 2-(47) | 600 | 1.8 |
| 2-28 | 2-(48) | 590 | 1.8 |
| 2-29 | 2-(49) | 580 | 2.2 |
| 2-30 | 2-(50) | 600 | 2.4 |
| 2-31 | 2-(52) | 600 | 2.4 |
| 2-32 | 2-(54) | 590 | 4.3 |
| 2-33 | 2-(57) | 600 | 2.6 |
| 2-34 | 2-(58) | 610 | 2.3 |
| 2-35 | 2-(59) | 600 | 2.0 |
| 2-36 | 2-(64) | 590 | 2.4 |
| 2-37 | 2-(51) | 585 | 1.7 |
| 2-38 | 2-(53) | 600 | 2.0 |
| 2-39 | 2-(55) | 610 | 2.8 |
| 2-40 | 2-(60) | 610 | 2.5 |

COMPARATIVE EXAMPLES 2-1 TO 2-2

Example 2-1 was repeated except that comparative disazo pigments 2-1 and 2-2 were used in place of the disazo pigment No. 2-(1) according to the present invention to prepare corresponding photosensitive members to provide Comparative sample 2-1 and Comparative sample 2-2.

Electrophotographic characteristics were evaluated in the same manner as Example 2-1 to obtain the results shown in Table 2-2.

TABLE 2-2

| | Structural formula | $V_0(-V)$ | $E_{\frac{1}{2}}$ (l·s) |
|---|---|---|---|
| Comparative example 2-1 | [structure: bis-azo pigment with N-NO-phenyl-N=N-hydroxynaphthalene-CONH-(2,4-dimethylphenyl)], subscript 2 | 580 | 7.9 |
| Comparative example 2-2 | [structure: bis-azo pigment with N-NO-phenyl-N=N-hydroxynaphthalene-CONH-phenyl], subscript 2 | 520 | 13.2 |
| Example 2-1 | [structure: bis-azo pigment with N-NO-phenyl-N=N-hydroxyanthracene-CONH-phenyl], subscript 2 | 570 | 4.0 |
| Example 2-2 | [structure: bis-azo pigment with N-NO-phenyl-N=N-hydroxynaphthalene-CONH-(2,4-dimethylphenyl) with HN-linked fused ring], subscript 2 | 600 | 3.3 |

From Table 2-2, it can be seen that the pigment of the non-3-hydroxy-naphthalenecarboxylic acid anilide type coupler according to the present invention has very excellent electrophotographic characteristics.

EXAMPLES 2-41 TO 2-45

By use of the photosensitive members used in Examples 2-1, 2-3, 2-4, 2-17 and 2-19, fluctuations in potential at light portion and potential at dark portion during repeated uses were measured in the same manner as in Example 1-41. The results are shown in Table 2-3.

TABLE 2-3

| Photosensitive member Example | Example | Initial values $V_D(-V)$ | $V_L(-V)$ | After 5000 sheet copying $V_D(-V)$ | $V_L(-V)$ |
|---|---|---|---|---|---|
| 2-41 | 2-1 | 600 | 100 | 625 | 120 |
| 2-42 | 2-3 | 590 | 100 | 630 | 120 |
| 2-43 | 2-4 | 590 | 110 | 620 | 130 |
| 2-44 | 2-17 | 600 | 90 | 630 | 110 |
| 2-45 | 2-19 | 610 | 100 | 630 | 130 |

EXAMPLE 2-46

On the charge generation layer prepared in Example 2-1, a charge transport layer was formed in the same manner as in Example 1-46.

The electrophotographic photosensitive member thus prepared was subjected to measurement of charging characteristics according to the same method as in Example 1-1. The charging polarity was made ⊕. The results are shown in Table 2-4.

TABLE 2-4

| Vo: | ⊕ 550 volt |
|---|---|
| $E_{\frac{1}{2}}$: | 5.0 lux · sec |

EXAMPLE 2-47

The procedure of Example 1-47 was repeated except for using disazo pigment 2-(1) in place of pigment No. 1-(1) to prepare a photosensitive member.

The charging characteristics and durability characteristics of the photosensitive member thus prepared were measured in the same manner as Example 1-1 and Example 1-41. The results are shown in Table 2-5.

TABLE 2-5

| Vo: −590 V | | | |
|---|---|---|---|
| $E_{\frac{1}{2}}$ 4.0 lux · sec | | | |
| Durability characteristics: | | | |
| Initial | | After 5000 sheet copying | |
| $V_D$ | $V_L$ | $V_D$ | $V_L$ |
| −600 V | −100 V | −620 V | −120 V |

From the results shown in Table 2-5, the photosensitive member of the present invention has good sensitivity and also good in potential stability when repeatedly used.

EXAMPLE 2-48

Example 1-48 was repeated except for using disazo pigment 2-(26) in place of pigment 1-(17) to prepare a photosensitive member.

The charging characteristics and durability characteristics of the photosensitive member thus prepared were measured in the same manner as Example 1-1. The results are shown in Table 2-6.

TABLE 2-6

| Vo: ⊕ 550 V | | | |
|---|---|---|---|
| $E_{\frac{1}{2}}$: 6.0 lux · sec | | | |
| Durability characteristics: | | | |
| Initial | | After 5000 sheet copying | |
| $V_D$ | $V_L$ | $V_D$ | $V_L$ |
| +600 | +90 | +580 | +150 |

EXAMPLE 2-49

On the casein layer of the aluminum substrate applied with the casein layer used in Example 2-1, the charge transport layer and the charge generation layer of Example 2-1 were successively laminated. Thus, a photosensitive member was prepared in entirely the same manner as Example 2-1 except for the different layer constitution, and subjected to charging measurement in the same manner as Example 2-1. However, the charging polarity was made ⊕. The results are shown in Table 2-7.

TABLE 2-7

| Vo: | ⊕ 550 V |
|---|---|
| $E_{\frac{1}{2}}$: | 5.0 lux · sec |

EXAMPLE 2-50

The procedure of Example 1-50 was repeated except for using disazo pigment 2-(4) in place of pigment No. 1-(4) to prepare a photosensitive member.

The potential $V_K$ and exposure quantity $E_{\frac{1}{2}}$ of the photosensitive member thus prepared were measured in the same manner as in Example 1-50. The results obtained are as follows.

Vo: −540 volt $V_K$: 93%

$E_{\frac{1}{2}}$: 1.2 microjoule/cm².

What we claim is:

1. An electrophotographic photosensitive member comprising a photosensitive layer on a substrate, said photosensitive layer comprising a disazo pigment represented by the formula:

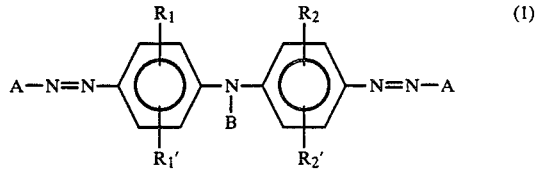

wherein $R_1$, $R_1'$, $R_2$ and $R_2'$ represent hydrogen, halogen, nitro, cyano, or alkyl, aralkyl, alkoxy or aryl group which may have a substituent, A represents a coupler residue having a phenolic OH group, and B represents hydrogen or nitroso group, said A being selected from the formulas (2) to (8) shown below:

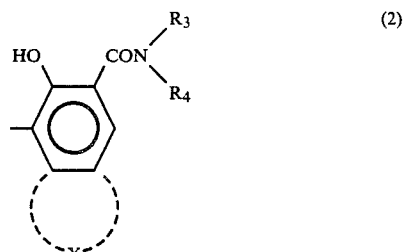

(3) 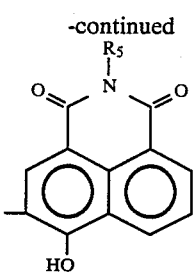

(4) 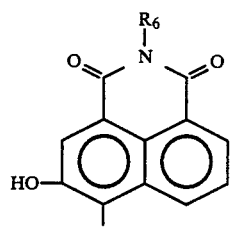

(5) 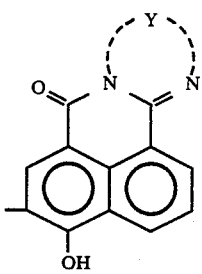

(6) 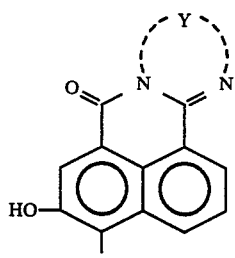

(7) 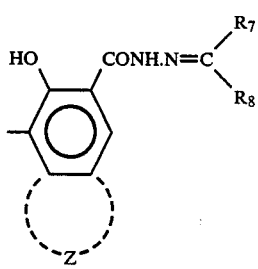

(8) 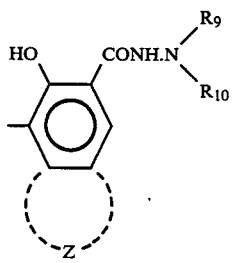

wherein X represents a residue to be fused with a benzene ring to form a polycyclic aromatic ring of anthracene ring, or a heterocyclic ring; $R_3$ and $R_4$ represent hydrogen, alkyl, aralkyl, aryl or heterocyclic ring which may have a substituent, or taken together represent a residue to form a cyclic amino group together with nitrogen atom; $R_5$ and $R_6$ each represent alkyl, aralkyl, aryl which may have a substituent; Y represents a divalent aromatic hydrocarbon group or forms a divalent heterocyclic group together with nitrogen atom; Z represents a residue to be fused with a benzene ring to form a polycyclic aromatic ring or heterocyclic ring; $R_7$ and $R_8$ represent hydrogen, aryl or heterocyclic group which may have substituent or a residue which forms a 5- to 6-membered ring together with the center carbon atom, which 5- to 6-membered ring may have a fused aromatic ring; $R_9$ and $R_{10}$ represent hydrogen, alkyl, aralkyl, aryl or heterocyclic group which may have a substituent.

2. An electrophotographic photosensitive member according to claim 1, wherein the above photosensitive member is a function separation type comprising a charge generation layer and a charge transport layer, said charge generation layer containing the disazo pigment represented by the above formula (1).

3. An electrophotographic photosensitive member according to claim 2, wherein the charge transport layer is laminated on the charge generation layer.

4. An electrophotographic photosensitive member according to claim 2, wherein the charge generation layer is laminated on the charge transport layer.

5. An electrophotographic photosensitive member according to claim 2, wherein a charge transportatable compound selected from hydrazones, pyrazolines and fluorenones is contained in the charge transport layer.

6. An electrophotographic photosensitive member according to claim 1, wherein $R_3$ in the above formula (2) is hydrogen and $R_4$ is a substituted phenyl represented by the formula:

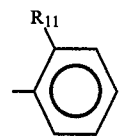 (7)

wherein $R_{11}$ is a substituent selected from halogen, nitro, cyano, and trifluoromethyl group.

7. An electrophotographic photosensitive member according to claim 1, wherein A in the above formula (1) is represented by the formula (9):

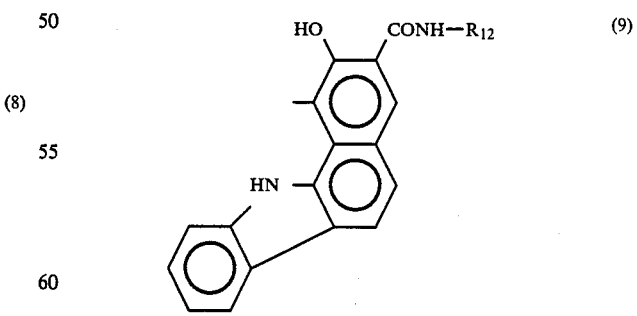 (9)

wherein $R_{12}$ represents a phenyl group which may have a substituent.

8. An electrophotographic photosensitive member according to claim 1, wherein B in formula (1) is hydrogen.

* * * * *

UNITED STATES PATENT AND TRADEMARK OFFICE
CERTIFICATE OF CORRECTION

PATENT NO. : 4,760,003            Page 1 of 4
DATED : July 26, 1988
INVENTOR(S) : MASAKAZU MATSUMOTO, ET AL.

It is certified that error appears in the above-identified patent and that said Letters Patent is hereby corrected as shown below:

COLUMN 1

Line 29, "synthetized" should read --synthesized--.
Line 68, "or;" should read --or--.

COLUMN 3

Line 32, "__" should be deleted.

COLUMN 5

Line 32, "__" should be deleted.

COLUMN 7

Line 32, "__" should be deleted.

COLUMN 9

Line 32, "__" should be deleted.

COLUMN 10

Formula 1-(18), "CONHN=CH" should read --CONH•N=CH--.

COLUMN 11

Line 32, "__" should be deleted.

UNITED STATES PATENT AND TRADEMARK OFFICE
CERTIFICATE OF CORRECTION

PATENT NO. : 4,760,003
DATED : July 26, 1988
INVENTOR(S) : MASAKAZU MATSUMOTO, ET AL.

It is certified that error appears in the above-identified patent and that said Letters Patent is hereby corrected as shown below:

COLUMN 13

Line 32, "___" should be deleted.

COLUMN 15

Formula 1-(35), "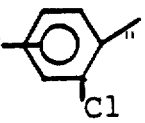" should read --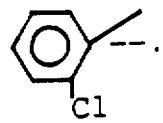--.

COLUMN 19

Line 32, "___" should be deleted.

COLUMN 21

Formula 2-(13), "" should read --Cl--.

COLUMN 33

Formula 2-(53), "HC=NHNOC" should read --CH=NHNOC--.
Formula 2-(54), "HC=NHNOC" should read --CH=NHNOC--.
Formula 2-(55), "HC=NHNOC" should read --CH=NHNOC--.

COLUMN 39

Line 47, "much" should read --many--.
Line 62, "polyalylate" should read --polyarylate--.
Line 63, "binsphenol A" should read --bisphenol A--.

UNITED STATES PATENT AND TRADEMARK OFFICE
CERTIFICATE OF CORRECTION

PATENT NO. : 4,760,003
DATED : July 26, 1988
INVENTOR(S) : MASAKAZU MATSUMOTO, ET AL.

It is certified that error appears in the above-identified patent and that said Letters Patent is hereby corrected as shown below:

COLUMN 40

Line 42, "cahrge" should read --charge--.

COLUMN 41

Line 48, "polyalylate" should read --polyarylate--.

COLUMN 42

Line 7, "vaccum" should read --vacuum--.
Line 20, "poliamide" should read --polyamide--.
Line 30, "changed" should read --charged--.
Line 40, "develped" should read --developed--.
Line 52, "negative" should read --negatively--.

COLUMN 43

Line 8, "the" should read --The--.

COLUMN 47

Line 64-5, "Examples 1-41 to 1-45, and Comparative Examples 1-6 to 1-10" should be a heading.

COLUMN 48

Line 43, "an" should read --a--.

UNITED STATES PATENT AND TRADEMARK OFFICE
CERTIFICATE OF CORRECTION

PATENT NO. : 4,760,003
DATED : July 26, 1988
INVENTOR(S) : MASAKAZU MATSUMOTO, ET AL.

It is certified that error appears in the above-identified patent and that said Letters Patent is hereby corrected as shown below:

COLUMN 49

Line 65, "polyalylate" should read --polyarylate--.

COLUMN 52

Line 4, "2-(1) to 2-(60)" should read --2-(1) to 2-(64)--.

COLUMN 58

Line 29, "transportatable" should read --transportable--.

Signed and Sealed this

Twenty-eighth Day of March, 1989

Attest:

DONALD J. QUIGG

Attesting Officer

Commissioner of Patents and Trademarks